United States Patent
Inoue et al.

(10) Patent No.: US 11,223,060 B2
(45) Date of Patent: Jan. 11, 2022

(54) ELECTROCHEMICAL REACTION SINGLE CELL AND ELECTROCHEMICAL REACTION CELL STACK

(71) Applicant: MORIMURA SOFC TECHNOLOGY CO., LTD., Komaki (JP)

(72) Inventors: Shiro Inoue, Nagoya (JP); Makoto Kuribayashi, Nagoya (JP); Tatsuya Ono, Nagoya (JP)

(73) Assignee: MORIMURA SOFC TECHNOLOGY CO., LTD., Komaki (JP)

( * ) Notice: Subject to any disclaimer, the term of this patent is extended or adjusted under 35 U.S.C. 154(b) by 106 days.

(21) Appl. No.: 16/485,557

(22) PCT Filed: Nov. 15, 2017

(86) PCT No.: PCT/JP2017/041020
§ 371 (c)(1),
(2) Date: Aug. 13, 2019

(87) PCT Pub. No.: WO2018/150664
PCT Pub. Date: Aug. 23, 2018

(65) Prior Publication Data
US 2019/0372144 A1     Dec. 5, 2019

(30) Foreign Application Priority Data
Feb. 16, 2017 (JP) .............................. JP2017-026544

(51) Int. Cl.
| | | |
|---|---|---|
| *H01M 8/1213* | (2016.01) | |
| *H01M 8/1253* | (2016.01) | |
| *C25B 9/08* | (2006.01) | |
| *C25B 9/19* | (2021.01) | |
| *H01M 8/124* | (2016.01) | |

(52) U.S. Cl.
CPC ............. *H01M 8/1253* (2013.01); *C25B 9/19* (2021.01); *H01M 8/1213* (2013.01); *H01M 2008/1293* (2013.01); *H01M 2300/0077* (2013.01)

(58) Field of Classification Search
CPC ............. H01M 8/1253; H01M 8/1213; H01M 2008/1293; H01M 2300/0077; H01M 4/86; H01M 8/12; H01M 8/24; H01M 8/2404; C25B 9/19; Y02E 60/36; Y02E 60/50
See application file for complete search history.

(56) References Cited

U.S. PATENT DOCUMENTS

| | | | |
|---|---|---|---|
| 2011/0195343 A1 | 8/2011 | Watts et al. | |
| 2013/0011768 A1 | 1/2013 | Ahn | |
| 2014/0322633 A1* | 10/2014 | Seong ................. | H01M 4/8663 429/532 |
| 2020/0099062 A1* | 3/2020 | Hara ................... | H01M 8/1253 |

FOREIGN PATENT DOCUMENTS

| | | |
|---|---|---|
| EP | 3 021 393 A1 | 5/2016 |
| JP | 2013-041809 A | 2/2013 |
| JP | 2014-026926 A | 2/2014 |
| JP | 2014-60161 A | 4/2014 |
| JP | 2016-126984 A | 7/2016 |
| KR | 10-2013-0052286 A | 5/2013 |

OTHER PUBLICATIONS

Search Report dated Feb. 6, 2018, issued by the International Searching Authority in International Application No. PCT/JP2017/041020 (PCT/ISA/210).
Communication dated Nov. 3, 2020, from the European Patent Office in corresponding European Application No. 17896935.8.
Communication dated Nov. 17, 2020, issued by the Korean Intellectual Property Office in counterpart Korean Application No. 10-2019-7023880.

* cited by examiner

*Primary Examiner* — Muhammad S Siddiquee
(74) *Attorney, Agent, or Firm* — Sughrue Mion, PLLC

(57) ABSTRACT

An electrochemical reaction single cell including an electrolyte layer containing Zr and at least one of Y, Sc, and Ca, an anode disposed on one side of the electrolyte layer, a cathode containing Sr and Co and disposed on the other side of the electrolyte layer, and an intermediate layer disposed between the electrolyte layer and the cathode. In the electrochemical reaction single cell, an $SrZrO_3$ integrated value calculated by a predetermined method is 600 to 10,300. Also disclosed is an electrochemical reaction cell stack including a plurality of electrochemical reaction single cells.

9 Claims, 12 Drawing Sheets

| SAMPLE No. | SZO INTEGRATED VALUE Vs | THICKNESS Ts OF SOLID SOLUTION LAYER 182 (μm) | SEPARATION OF CATHODE 114 | INITIAL VOLTAGE (V) | DETERMINATION |
|---|---|---|---|---|---|
| S1 | 196 | 0.51 | ABSENCE | 0.890 | × |
| S2 | 743 | 0.47 | ABSENCE | 0.905 | ○ |
| S3 | 2,896 | 0.38 | ABSENCE | 0.924 | ○ |
| S4 | 3,462 | 0.35 | ABSENCE | 0.925 | ○ |
| S5 | 3,933 | 0.34 | ABSENCE | 0.924 | ○ |
| S6 | 5,058 | 0.32 | ABSENCE | 0.924 | ○ |
| S7 | 6,441 | 0.30 | ABSENCE | 0.922 | ○ |
| S8 | 8,299 | 0.27 | ABSENCE | 0.913 | ○ |
| S9 | 9,780 | 0.25 | ABSENCE | 0.901 | ○ |
| S10 | 11,487 | 0.22 | ABSENCE | 0.886 | × |
| S11 | 209 | 0.35 | PRESENCE | — | × |

F I G. 7

ELECTROCHEMICAL REACTION SINGLE CELL AND ELECTROCHEMICAL REACTION CELL STACK

CROSS REFERENCE TO RELATED APPLICATIONS

This application is a National Stage of International Application No. PCT/JP2017/041020 filed on Nov. 15, 2017, claiming priority based on Japanese Patent Application No. 2017-026544, filed Feb. 16, 2017.

TECHNICAL FIELD

A technique disclosed in the present specification relates to an electrochemical reaction single cell.

BACKGROUND ART

A known type of a fuel cell for generating electricity by utilizing electrochemical reaction between hydrogen and oxygen is a solid oxide fuel cell (hereinafter may be referred to as "SOFC"). A single cell of a fuel cell (hereinafter may be referred to simply as a "single cell"), which is a constitutive unit of SOFC, includes an electrolyte layer containing a solid oxide, a cathode, and an anode such that the cathode and the anode face each other in a predetermined direction (hereinafter referred to as a "first direction") and the electrolyte layer intervenes between these electrodes. The electrolyte layer is formed so as to contain, for example, YSZ (yttria-stabilized zirconia). The cathode is formed so as to contain, for example, LSCF (lanthanum strontium cobalt ferrite).

In the single cell, the diffusion of Sr (strontium) contained in the cathode toward the electrolyte layer and the reaction between the diffused Sr and Zr (zirconium) contained in the electrolyte layer cause generation of $SrZrO_3$ (hereinafter may be referred to as "SZO"), which is a substance of high resistance. The generation of SZO increases electric resistance in the first direction, resulting in poor electricity generation performance of the single cell. A known technique for preventing a reduction in electricity generation performance due to the generation of SZO involves disposing of an intermediate layer between the cathode and the electrolyte layer (see, for example, Patent Document 1). The intermediate layer prevents diffusion of Sr from the cathode to the electrolyte layer, thereby preventing generation of SZO. The intermediate layer is formed so as to contain, for example, GDC (gadolinium-doped ceria).

PRIOR ART DOCUMENT

Patent Document

Patent Document 1: Japanese Patent Application Laid-Open (kokai) No. 2014-60161

SUMMARY OF THE INVENTION

Problem to be Solved by the Invention

In the aforementioned conventional technique, a smaller amount of SZO contained in the single cell is more preferred. However, the present inventors have newly found that an excessively small amount of SZO contained in the single cell may cause impairment of electricity generation performance and separation between the intermediate layer and the cathode. Thus, the aforementioned conventional technique has room for improvement in terms of prevention of a reduction in the electricity generation performance of the single cell, and prevention of separation between the intermediate layer and the cathode.

Such a problem is common with an electrolysis single cell, which is a constitutive unit of a solid oxide electrolysis cell (hereinafter may be referred to as "SOEC") for generating hydrogen by utilizing the electrolysis of water. In the present specification, a fuel cell single cell and an electrolysis single cell are collectively referred to as an "electrochemical reaction single cell." Such a problem is also common with electrochemical reaction single cells other than SOFC and SOEC.

The present specification discloses a technique capable of solving the aforementioned problems.

Means for Solving the Problem

A technique disclosed in the present specification can be implemented, for example, in the following modes.

(1) An electrochemical reaction single cell disclosed in the present specification comprises an electrolyte layer containing Zr and at least one of Y, Sc, and Ca, an anode disposed on one side of the electrolyte layer in a first direction, a cathode containing Sr and Co and disposed on the other side of the electrolyte layer in the first direction, and an intermediate layer disposed between the electrolyte layer and the cathode, the electrochemical reaction single cell being characterized by exhibiting an $SrZrO_3$ integrated value of 600 to 10,300, the $SrZrO_3$ integrated value being calculated as follows:

a 20 μm×20 μm rectangular field of view in at least one cross section parallel to the first direction and including the cathode, the intermediate layer, and the electrolyte layer is divided into 256×256 pixels, wherein two sides of the four sides forming the rectangular field of view are approximately parallel to the boundary between the intermediate layer and the electrolyte layer, and Sr intensity mapping data representing Sr intensities in the pixels are generated by means of EPMA mapping;

an Sr intensity line integrated value, which is the integrated value of Sr intensities in pixels in each of 256 pixel lines, is calculated, wherein the pixel lines are approximately orthogonal to the first direction in the Sr intensity mapping data;

an intensity curve obtained by plotting the Sr intensity line integrated values against the pixel lines has an electrolyte layer integrated value portion exhibiting the Sr intensity line integrated value of a portion of the electrolyte layer having an approximately uniform Sr intensity line integrated value, a first integrated value portion exhibiting an Sr intensity line integrated value approximately equal to the Sr intensity line integrated value of the electrolyte layer integrated value portion, and a second integrated value portion located between the electrolyte layer integrated value portion and the first integrated value portion and exhibiting an Sr intensity line integrated value larger than the Sr intensity line integrated value of the electrolyte layer integrated value portion; and a straight base line is drawn by connecting a first point and a second point in the second integrated value portion, and the area of a region surrounded by the base line and the second integrated value portion is calculated as the $SrZrO_3$ integrated value, wherein the first point corresponds to the minimum Sr intensity line integrated value on the electrolyte layer side with respect to a peak pixel line at which the Sr intensity line integrated value is maximum in the second integrated value portion, and the second point corresponds to the minimum Sr intensity line integrated value on the cathode side with respect to the peak pixel line. In the present electrochemical reaction single cell, the $SrZrO_3$ integrated value, which indicates the amount of $SrZrO_3$ (i.e., a substance of high resistance), is 10,300 or less. This can prevent impairment of the performance of the electrochemical reaction single cell, which would otherwise occur due to deposition of $SrZrO_3$. In the present electrochemical reaction single cell, the $SrZrO_3$ integrated value is 600 or more, which indicates that the cathode is fired at a certain high temperature. Thus, separation between the intermediate layer and the cathode can be prevented.

(2) In the above-described electrochemical reaction single cell, the intermediate layer may include a solid solution layer containing at least one of Gd and Sm, Ce, and Zr, and the solid solution layer may have a thickness of 0.246 µm to 0.482 µm. This configuration of the present electrochemical reaction single cell can prevent impairment of the performance of the electrochemical reaction single cell, which would otherwise occur due to an excessive increase in the thickness of the solid solution layer of high resistance. In addition, impairment of the performance of the electrochemical reaction single cell due to an increase in $SrZrO_3$ integrated value can be prevented by increasing the thickness of the solid solution layer to a certain extent.

(3) In the above-described electrochemical reaction unit, the $SrZrO_3$ integrated value in at least one cross section parallel to the first direction may be 1,600 to 9,200. In the present electrochemical reaction single cell, the $SrZrO_3$ integrated value is 9,200 or less. This can effectively prevent impairment of the performance of the electrochemical reaction single cell, which would otherwise occur due to deposition of $SrZrO_3$. In the present electrochemical reaction single cell, the $SrZrO_3$ integrated value is 1,600 or more, and thus separation between the intermediate layer and the cathode can be effectively prevented.

(4) In the above-described electrochemical reaction single cell, the intermediate layer may include a solid solution layer containing at least one of Gd and Sm, Ce, and Zr, and the solid solution layer may have a thickness of 0.271 µm to 0.457 µm. This configuration of the present electrochemical reaction single cell can effectively prevent impairment of the performance of the electrochemical reaction single cell, which would otherwise occur due to an excessive increase in the thickness of the solid solution layer of high resistance. In addition, impairment of the performance of the electrochemical reaction single cell due to an increase in $SrZrO_3$ integrated value can be prevented effectively by increasing the thickness of the solid solution layer to a certain extent.

(5) In the above-described electrochemical reaction single cell, the $SrZrO_3$ integrated value in at least one cross section parallel to the first direction may be 3,100 to 7,800. In the present electrochemical reaction single cell, the $SrZrO_3$ integrated value is 7,800 or less. This can more effectively prevent impairment of the performance of the electrochemical reaction single cell, which would otherwise occur due to deposition of $SrZrO_3$. In the present electrochemical reaction single cell, the $SrZrO_3$ integrated value is 3,100 or more, and thus separation between the intermediate layer and the cathode can be more effectively prevented.

(6) In the above-described electrochemical reaction single cell, the intermediate layer may include a solid solution layer containing at least one of Gd and Sm, Ce, and Zr, and the solid solution layer may have a thickness of 0.307 µm to 0.422 µm. This configuration of the present electrochemical reaction single cell can more effectively prevent impairment of the performance of the electrochemical reaction single cell, which would otherwise occur due to an excessive increase in the thickness of the solid solution layer of high resistance. In addition, impairment of the performance of the electrochemical reaction single cell due to an increase in $SrZrO_3$ integrated value can be prevented more effectively by increasing the thickness of the solid solution layer to a certain extent.

(7) In the above-described electrochemical reaction single cell, the electrolyte layer may contain a solid oxide. The configuration of the present electrochemical reaction single cell can prevent impairment of the performance of the single cell due to deposition of $SrZrO_3$, even in the case where the impairment of the performance of the single cell due to deposition of $SrZrO_3$ is likely to occur.

(8) In the above-described electrochemical reaction single cell, the electrochemical reaction single cell may be a fuel cell single cell. According to the present electrochemical reaction single cell, impairment of electricity generation performance, which would otherwise occur due to deposition of $SrZrO_3$, can be prevented.

The technique disclosed in the present specification can be implemented in various modes; for example, an electrochemical reaction single cell (fuel cell single cell or electrolysis single cell), an electrochemical reaction cell stack (fuel cell stack or electrolysis cell stack) including a plurality of electrochemical reaction single cells, and a production method therefor.

BRIEF DESCRIPTION OF THE DRAWINGS

FIG. 7 Explanatory table showing the results of performance evaluation.

MODES FOR CARRYING OUT THE INVENTION

A. Embodiment

A-1. Structure:
(Structure of Fuel Cell Stack 100)

Figure 1:
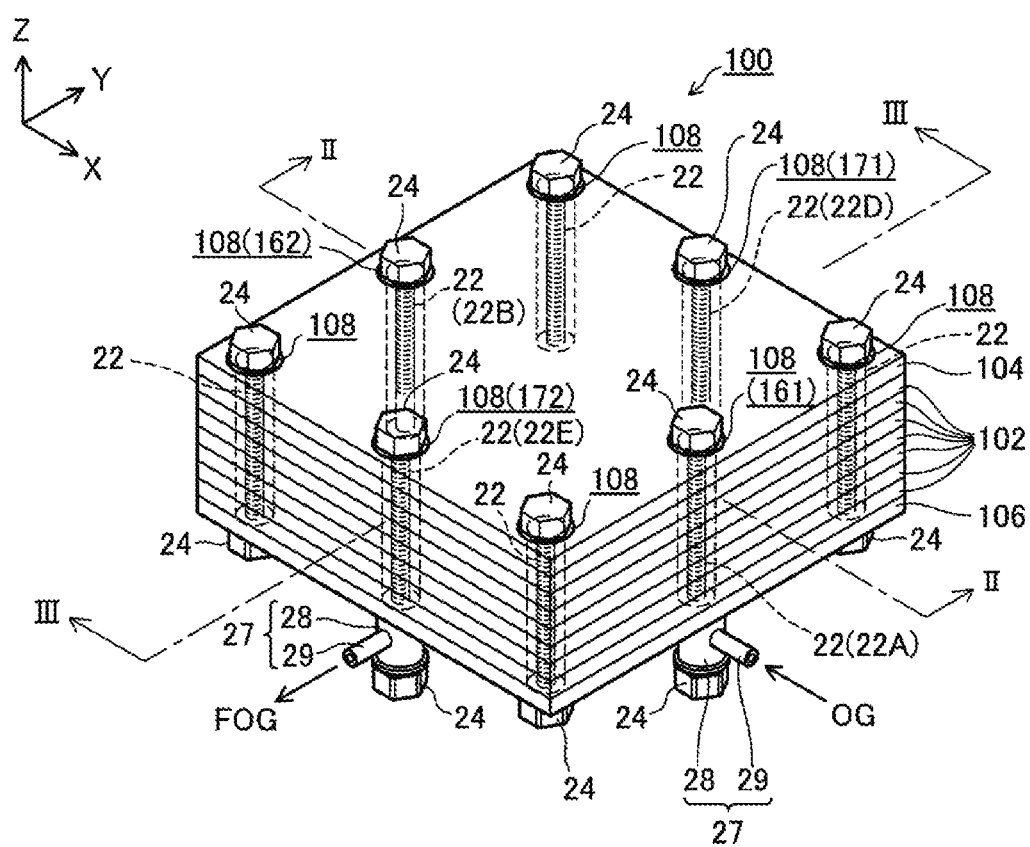
FIG. 1 Perspective view showing the external appearance of a fuel cell stack 100 according to the present embodiment.
Figure 2:
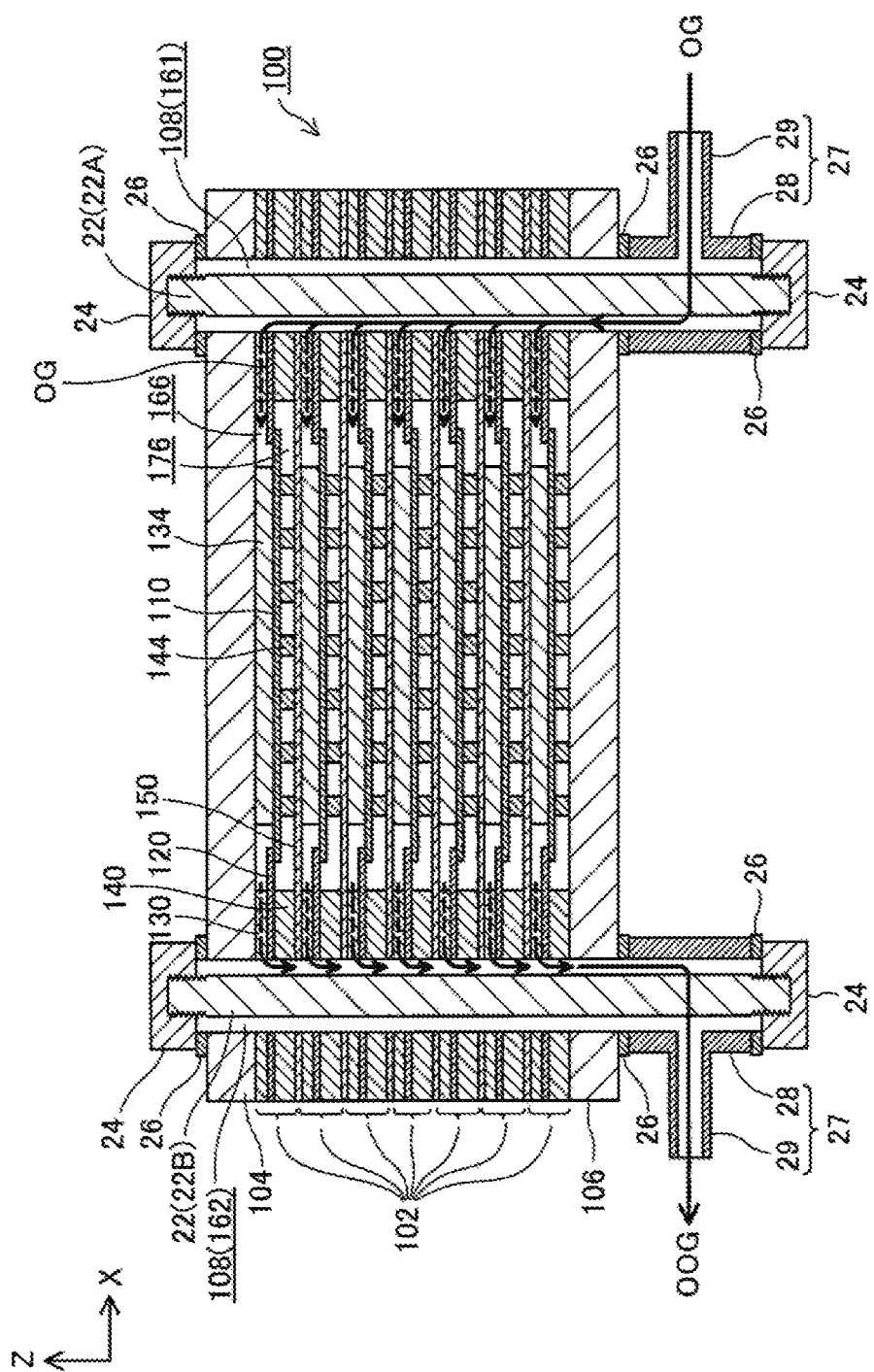
FIG. 2 Explanatory view showing an XZ section of the fuel cell stack 100 taken along line II-II of FIG. 1.
Figure 3:
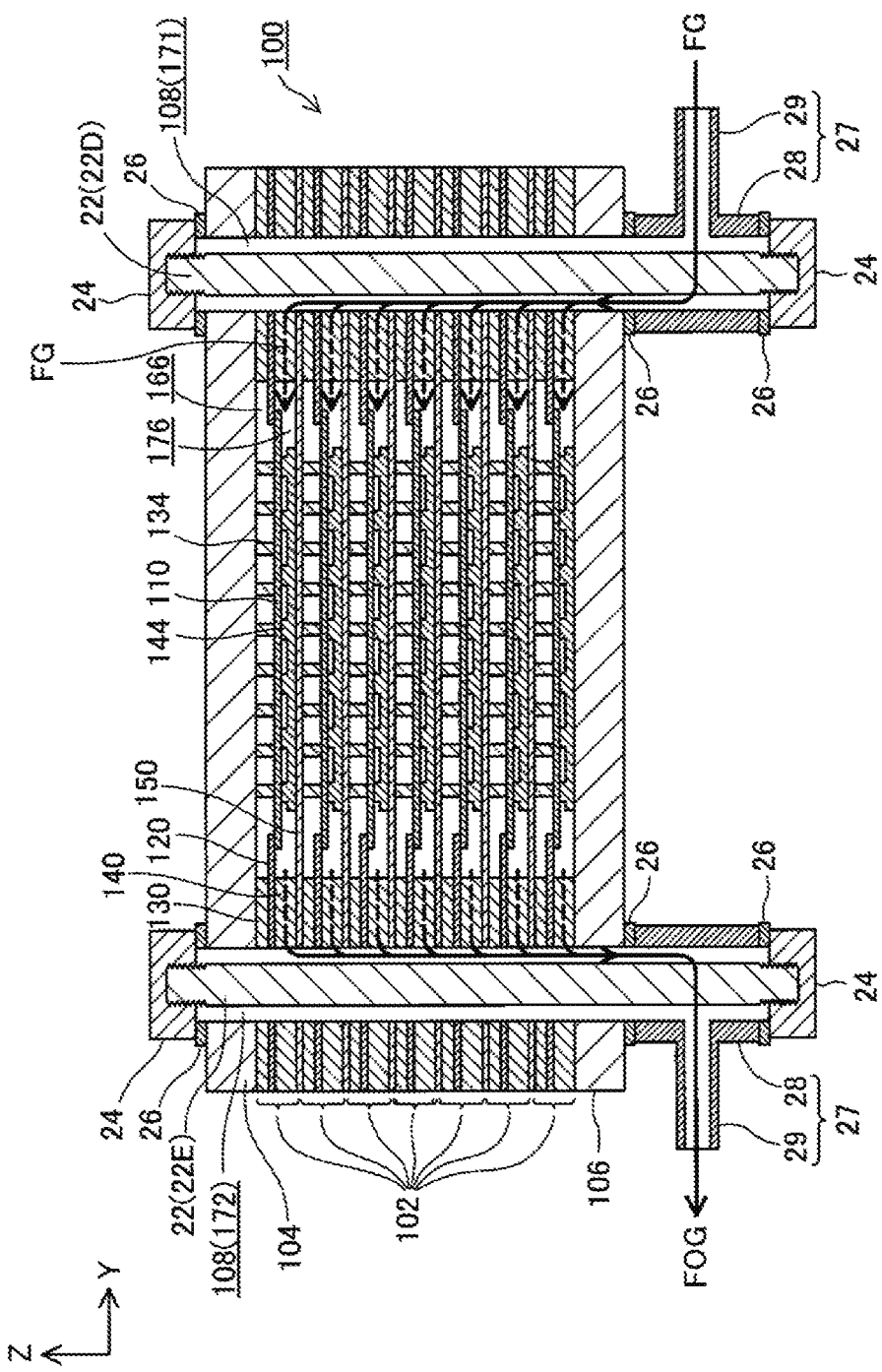
FIG. 3 Explanatory view showing a YZ section of the fuel cell stack 100 taken along line III-III of FIG. 1.

FIG. 1 is a perspective view showing the external appearance of a fuel cell stack 100 according to the present embodiment; FIG. 2 is an explanatory view showing an XZ section of the fuel cell stack 100 taken along line II-II of FIG. 1; and FIG. 3 is an explanatory view showing a YZ section of the fuel cell stack 100 taken along line III-III of FIG. 1. FIGS. 1 to 3 show mutually orthogonal X-axis, Y-axis, and Z-axis for specifying respective directions. In the present specification, for the sake of convenience, the positive Z-axis direction is called the "upward direction" and the negative Z-axis direction is called the "downward direction"; however, in actuality, the fuel cell stack 100 may be disposed in a different orientation. The same also applies to FIG. 4 and subsequent drawings.

The fuel cell stack 100 includes a plurality of (seven in the present embodiment) of electricity generation units 102 and a pair of end plates 104 and 106. The seven electricity generation units 102 are disposed in a predetermined direction of array (in the vertical direction in the present embodiment). A pair of the end plates 104 and 106 is disposed in such a manner as to hold an assembly of the seven electricity generation units 102 from the upper and lower sides thereof. The direction of array (vertical direction) corresponds to the first direction appearing in CLAIMS.

The fuel cell stack 100 has a plurality (eight in the present embodiment) of holes extending in the vertical direction through peripheral portions about the Z-axis direction of its component layers (the electricity generation units 102 and the end plates 104 and 106). The corresponding holes formed in the layers communicate with one another in the vertical direction, thereby forming communication holes 108 extending in the vertical direction from one end plate 104 to the other end plate 106. In the following description, individual holes which constitute each communication hole 108 and are formed in the individual layers of the fuel cell stack 100 may be referred to as the "communication holes 108."

Bolts 22 extending in the vertical direction are inserted into the corresponding communication holes 108, and the fuel cell stack 100 is fastened by means of the bolts 22 and nuts 24 engaged with opposite ends of the bolts 22. As shown in FIGS. 2 and 3, corresponding insulation sheets 26 intervene between the nuts 24 engaged with one ends (upper ends) of the bolts 22 and the upper surface of the end plate 104 serving as the upper end of the fuel cell stack 100 and between the nuts 24 engaged with the other ends (lower ends) of the bolts 22 and the lower surface of the end plate 106 serving as the lower end of the fuel cell stack 100. However, in each region where a gas passage member 27, which will be described later, is provided, the gas passage member 27 and the insulation sheets 26 disposed respectively on the upper end and on the lower end of the gas passage member 27 intervene between the nut 24 and the surface of the end plate 106. The insulation sheet 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space exists between the outer circumferential surface of the shaft portion of each bolt 22 and the inner circumferential surface of each communication hole 108. As shown in FIGS. 1 and 2, a space defined by the bolt 22 (bolt 22A) located at around the midpoint of one side of the perimeter about the Z-axis direction of the fuel cell stack 100 (a side at the positive side in the X-axis direction of two sides in parallel with the Y-axis) and the communication hole 108 into which the bolt 22A is inserted functions as an oxidizer gas introduction manifold 161 into which oxidizer gas OG is introduced from outside the fuel cell stack 100 and which serves as a gas flow channel for supplying the oxidizer gas OG to the electricity generation units 102, whereas a space defined by the bolt 22 (bolt 22B) located at around the midpoint of the other side opposite the above side (a side at the negative side in the X-axis direction of two sides in parallel with the Y-axis) and the communication hole 108 into which the bolt 22B is inserted functions as an oxidizer gas discharge manifold 162 from which oxidizer offgas OOG discharged from the cathode chambers 166 of the electricity generation units 102 is discharged to the outside of the fuel cell stack 100. In the present embodiment, for example, air is used as the oxidizer gas OG.

As shown in FIGS. 1 and 3, a space defined by the bolt 22 (bolt 22D) located at around the midpoint of one side of the perimeter about the Z-axis direction of the fuel cell stack 100 (a side at the positive side in the Y-axis direction of two sides in parallel with the X-axis) and the communication hole 108 into which the bolt 22D is inserted functions as a fuel gas introduction manifold 171 into which fuel gas FG is introduced from outside the fuel cell stack 100 and which supplies the fuel gas FG to the electricity generation units 102, whereas a space defined by the bolt 22 (bolt 22E) located at around the midpoint of the other side opposite the above side (a side at the negative side in the Y-axis direction of two sides in parallel with the X-axis) and the communication hole 108 into which the bolt 22E is inserted functions as a fuel gas discharge manifold 172 from which fuel offgas FOG discharged from the anode chambers 176 of the electricity generation units 102 is discharged to the outside of the fuel cell stack 100. In the present embodiment, for example, hydrogen-rich gas reformed from city gas is used as the fuel gas FG.

The fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 2, the hole of the body portion 28 of the gas passage member 27 disposed at the position of the bolt 22A which partially defines the oxidizer gas introduction manifold 161 communicates with the oxidizer gas introduction manifold 161, whereas the hole of the body portion 28 of the gas passage member 27 disposed at the position of the bolt 22B which partially defines the oxidizer gas discharge manifold 162 communicates with the oxidizer gas discharge manifold 162. Also, as shown in FIG. 3, the hole of the body portion 28 of the gas passage member 27 disposed at the position of the bolt 22D which partially defines the fuel gas introduction manifold 171 communicates with the fuel gas introduction manifold 171, whereas the hole of the body portion 28 of the gas passage member 27 disposed at the position of the bolt 22E which partially defines the fuel gas discharge manifold 172 communicates with the fuel gas discharge manifold 172.

(Structure of End Plates 104 and 106)

The two end plates 104 and 106 are electrically conductive members each having an approximately rectangular flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 are held under pressure between the two end plates 104 and 106. The upper end plate 104 functions as a positive output terminal of the fuel cell stack 100, and the lower end plate 106 functions as a negative output terminal of the fuel cell stack 100.

(Structure of Electricity Generation Unit 102)

Figure 4:
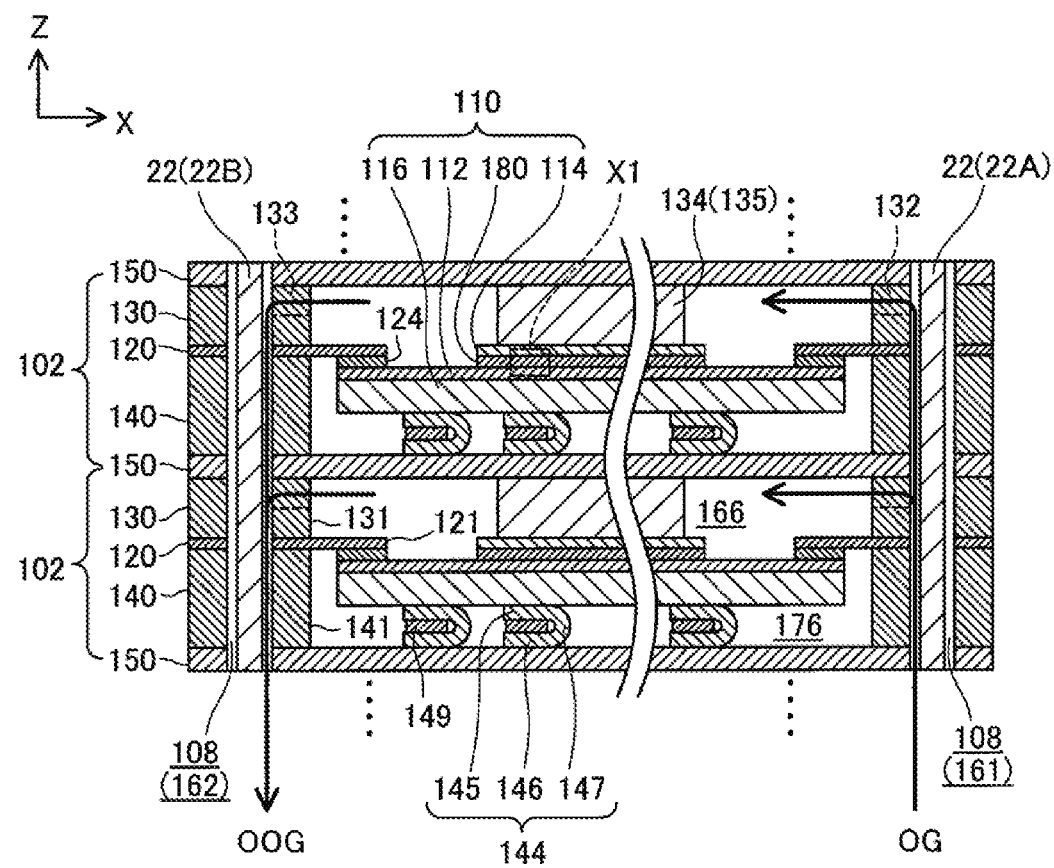
FIG. 4 Explanatory view showing XZ sections of two adjacent electricity generation units 102 at the same position as the section shown in FIG. 2.
Figure 5:
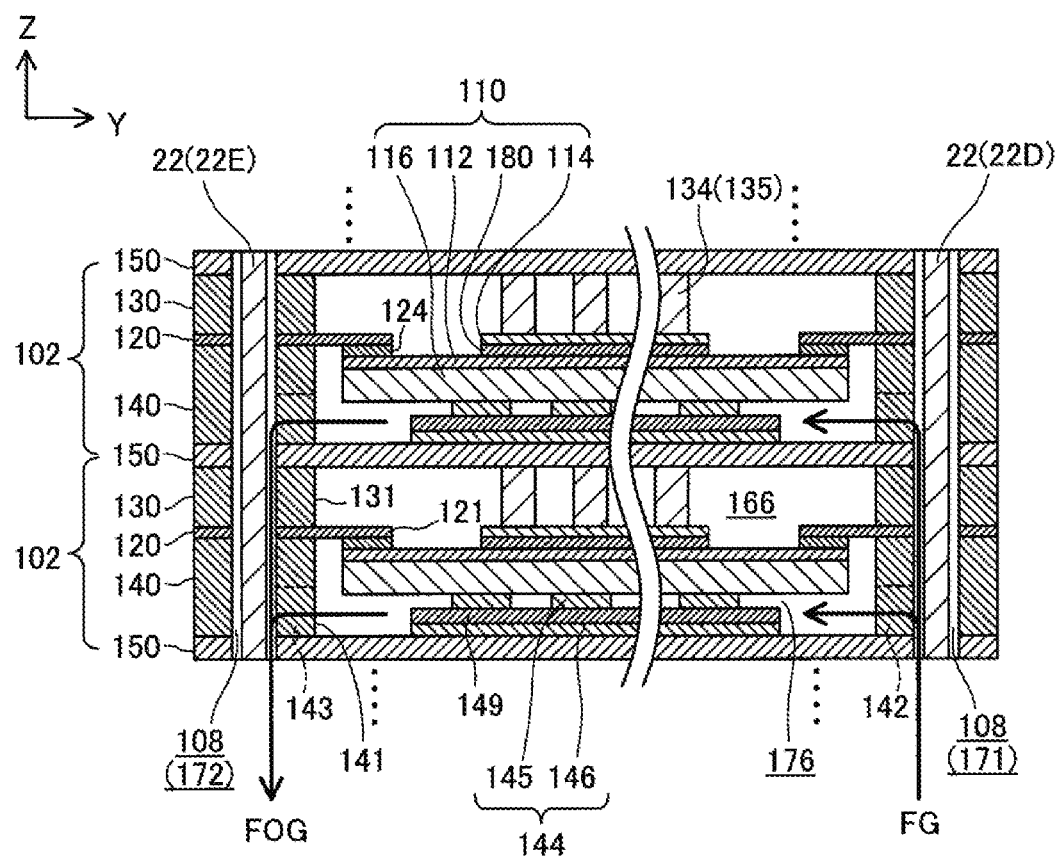
FIG. 5 Explanatory view showing YZ sections of two adjacent electricity generation units 102 at the same position as the section shown in FIG. 3.

FIG. 4 is an explanatory view of the same XZ section as that of FIG. 2, showing two adjacent electricity generation units 102, and FIG. 5 is an explanatory view of the same YZ section as that of FIG. 3, showing two adjacent electricity generation units 102.

As shown in FIGS. 4 and 5, the electricity generation unit 102 includes a single cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. Holes corresponding to the communication holes 108 into which the bolts 22 are inserted are formed in peripheral portions about the Z-axis direction of the separator 120, the cathode-side frame 130, the anode-side frame 140, and the interconnectors 150.

The interconnector 150 is an electrically conductive member having an approximately rectangular flat plate shape and is formed of, for example, ferritic stainless steel. The interconnector 150 secures electrical conductivity between the electricity generation units 102 and prevents mixing of reaction gases between the electricity generation units 102. In the present embodiment, two electricity generation units 102 are disposed adjacent to each other, and the two adjacent electricity generation units 102 share one interconnector 150. That is, the upper interconnector 150 of a certain electricity generation unit 102 serves as a lower interconnector 150 of the upper adjacent electricity generation unit 102. Also, since the fuel cell stack 100 has the two end plates 104 and 106, the uppermost electricity generation unit 102 of the fuel cell stack 100 does not have the upper interconnector 150, and the lowermost electricity generation unit 102 does not have the lower interconnector 150 (see FIGS. 2 and 3).

The single cell 110 includes an electrolyte layer 112, an anode 116 disposed on one vertical side (lower side) of the electrolyte layer 112, a cathode 114 disposed on the other vertical side (upper side) of the electrolyte layer 112, and an intermediate layer 180 disposed between the electrolyte layer 112 and the cathode 114. The single cell 110 of the present embodiment is an anode-support-type single cell in which the anode 116 supports the other layers of the single cell 110 (i.e., the electrolyte layer 112, the cathode 114, and the intermediate layer 180).

The electrolyte layer 112 is a member having an approximately rectangular flat-plate shape and is formed so as to contain YSZ (yttria-stabilized zirconia), which is a solid oxide. That is, the electrolyte layer 112 contains Zr (zirconium) and Y (yttrium). The cathode 114 is a member having an approximately rectangular flat-plate shape. In the present embodiment, the cathode 114 includes a current collecting layer 220, and an active layer 210 located on the lower side of the current collecting layer 220 (i.e., on the side toward the electrolyte layer 112) (see FIG. 6). The active layer 210 of the cathode 114 mainly functions as a site of ionization reaction of oxygen contained in the oxidizer gas OG. The active layer 210 is formed so as to contain LSCF (lanthanum strontium cobalt ferrite) and GDC (gadolinium-doped ceria) serving as an activation substance. The current collecting layer 220 of the cathode 114 mainly functions as a site of diffusing the oxidizer gas OG supplied from the cathode chamber 166 and collecting electricity obtained through electricity generation reaction. The current collecting layer 220 is formed so as to contain LSCF. That is, the cathode 114 contains Sr (strontium) and Co (cobalt). The anode 116 is a member having an approximately rectangular flat-plate shape and is formed of, for example, Ni (nickel), a cermet of Ni and ceramic powder, or an Ni-based alloy. Thus, the single cell 110 of the present embodiment is a solid oxide fuel cell (SOFC) containing a solid oxide as an electrolyte.

The intermediate layer 180 is a member having an approximately rectangular flat-plate shape and is formed so as to contain GDC (gadolinium-doped ceria) and YSZ. The intermediate layer 180 prevents generation of SZO of high resistance caused by reaction between Sr diffused from the cathode 114 and Zr contained in the electrolyte layer 112. The structure of a portion around the intermediate layer 180 in the single cell 110 will be detailed below.

The separator 120 is a frame member which has an approximately rectangular hole 121 formed in a central region thereof and extending therethrough in the vertical direction, and is formed of, for example, a metal. A portion of the separator 120 around the hole 121 faces a peripheral portion of the surface of the electrolyte layer 112 on the cathode 114 side. The separator 120 is bonded to the electrolyte layer 112 (single cell 110) by means of a bonding layer 124 formed of a brazing material (e.g., Ag brazing material) and disposed between the facing portion of the separator 120 and the electrolyte layer 112. The separator 120 separates the cathode chamber 166 which faces the cathode 114, and the anode chamber 176 which faces the anode 116, from each other, thereby preventing gas leakage from one electrode side to the other electrode side at a peripheral portion of the single cell 110.

The cathode-side frame 130 is a frame member which has an approximately rectangular hole 131 formed in a central region thereof and extending therethrough in the vertical direction, and is formed of, for example, an insulator such as mica. The hole 131 of the cathode-side frame 130 partially constitutes the cathode chamber 166 which faces the cathode 114. The cathode-side frame 130 is in contact with a peripheral portion of the surface of the separator 120 on the side opposite the electrolyte layer 112 and with a peripheral portion of the surface of the interconnector 150 on the side toward the cathode 114. The cathode-side frame 130 electrically insulates the two interconnectors 150 included in the electricity generation unit 102 from each other. Also, the cathode-side frame 130 has an oxidizer gas supply communication hole 132 formed therein and adapted to establish communication between the oxidizer gas introduction manifold 161 and the cathode chamber 166, and an oxidizer gas discharge communication hole 133 formed therein and adapted to establish communication between the cathode chamber 166 and the oxidizer gas discharge manifold 162.

The anode-side frame 140 is a frame member which has an approximately rectangular hole 141 formed in a central region thereof and extending therethrough in the vertical direction, and is formed of, for example, a metal. The hole 141 of the anode-side frame 140 partially constitutes the anode chamber 176 which faces the anode 116. The anode-side frame 140 is in contact with a peripheral portion of the surface of the separator 120 on the side toward the electrolyte layer 112 and with a peripheral portion of the surface of the interconnector 150 on the side toward the anode 116. Also, the anode-side frame 140 has a fuel gas supply communication hole 142 formed therein and adapted to establish communication between the fuel gas introduction manifold 171 and the anode chamber 176, and a fuel gas discharge communication hole 143 formed therein and adapted to establish communication between the anode chamber 176 and the fuel gas discharge manifold 172.

The anode-side current collector 144 is disposed within the anode chamber 176. The anode-side current collector 144 includes an interconnector facing portion 146, an electrode facing portion 145, and a connection portion 147 which connects the electrode facing portion 145 and the interconnector facing portion 146 to each other, and is formed of, for example, nickel, a nickel alloy, or stainless steel. The electrode facing portion 145 is in contact with the surface of the anode 116 on the side opposite the electrolyte layer 112, and the interconnector facing portion 146 is in contact with the surface of the interconnector 150 on the side toward the anode 116. As described above, since the electricity generation unit 102 disposed at the lowermost position in the fuel cell stack 100 does not have the lower interconnector 150, the interconnector facing portion 146 in the lowermost electricity generation unit 102 is in contact with the lower end plate 106. Since the anode-side current collector 144 is thus configured, the anode-side current collector 144 electrically connects the anode 116 and the interconnector 150 (or the end plate 106) to each other. A spacer 149 formed of, for example, mica is disposed between the electrode facing portion 145 and the interconnector facing portion 146. Thus, the anode-side current collector 144 follows the deformation of the electricity generation unit 102 stemming from a temperature cycle and a pressure variation of reaction gas, thereby maintaining good electrical connection between the anode 116 and the interconnector 150 (or the end plate 106) via the anode-side current collector 144.

The cathode-side current collector 134 is disposed within the cathode chamber 166. The cathode-side current collector 134 is composed of a plurality of current collector elements 135 each having an approximately rectangular columnar shape and is formed of, for example, ferritic stainless steel. The cathode-side current collector 134 is in contact with the surface of the cathode 114 on the side opposite the electrolyte layer 112 and with the surface of the interconnector 150 on the side toward the cathode 114. As described above, since the electricity generation unit 102 disposed at the uppermost position in the fuel cell stack 100 does not have the upper interconnector 150, the cathode-side current collector 134 in the uppermost electricity generation unit 102 is in contact with the upper end plate 104. Since the cathode-side current collector 134 is thus configured, the cathode-side current collector 134 electrically connects the cathode 114 and the interconnector 150 (or the end plate 104) to each other. In the present embodiment, the cathode-side current collector 134 and the interconnector 150 are integrally formed as a unitary member. That is, a flat-plate-shape portion orthogonal to the vertical direction (Z-axis direction) of the unitary member functions as the interconnector 150, and a plurality of the current collector elements 135 protruding from the flat-plate-shape portion toward the cathode 114 collectively function as the cathode-side current collector 134. The unitary member composed of the cathode-side current collector 134 and the interconnector 150 may be covered with an electrically conductive coating. An electrically conductive bonding layer may be provided between the cathode 114 and the cathode-side current collector 134 for bonding of the cathode 114 to the cathode-side current collector 134.

A-2. Operation of Fuel Cell Stack 100:

As shown in FIGS. 2 and 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27 and is then supplied from the oxidizer gas introduction manifold 161 to the cathode chambers 166 through the oxidizer gas supply communication holes 132 of the electricity generation units 102. Also, as shown in FIGS. 3 and 5, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27 and is then supplied from the fuel gas introduction manifold 171 to the anode chambers 176 through the fuel gas supply communication holes 142 of the electricity generation units 102.

When the oxidizer gas OG is supplied to the cathode chamber 166 of each electricity generation unit 102, whereas the fuel gas FG is supplied to the anode chamber 176 of each electricity generation unit 102, the single cell 110 generates electricity through the electrochemical reaction between the oxidizer gas OG and the fuel gas FG. The electricity generating reaction is an exothermic reaction. In each electricity generation unit 102, the cathode 114 of the single cell 110 is electrically connected to one interconnector 150 through the cathode-side current collector 134, whereas the anode 116 is electrically connected to the other interconnector 150 through the anode-side current collector 144. Also, a plurality of the electricity generation units 102 contained in the fuel cell stack 100 are connected electrically in series. Accordingly, electric energy generated in the electricity generation units 102 is output from the end plates 104 and 106 which function as output terminals of the fuel cell stack 100. In the SOFC, since electricity is generated at a relatively high temperature (e.g., 700° C. to 1,000° C.), the fuel cell stack 100 may be heated by a heater (not shown) from startup until the high temperature can be maintained by means of heat generated as a result of generation of electricity.

As shown in FIGS. 2 and 4, the oxidizer offgas OOG discharged from the cathode chambers 166 of the electricity generation units 102 is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 3 and 5, the fuel offgas FOG discharged from the anode chambers 176 of the electricity generation units 102 is discharged to the fuel gas discharge manifold 172 through the fuel gas discharge communication holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29.

Figure 6:
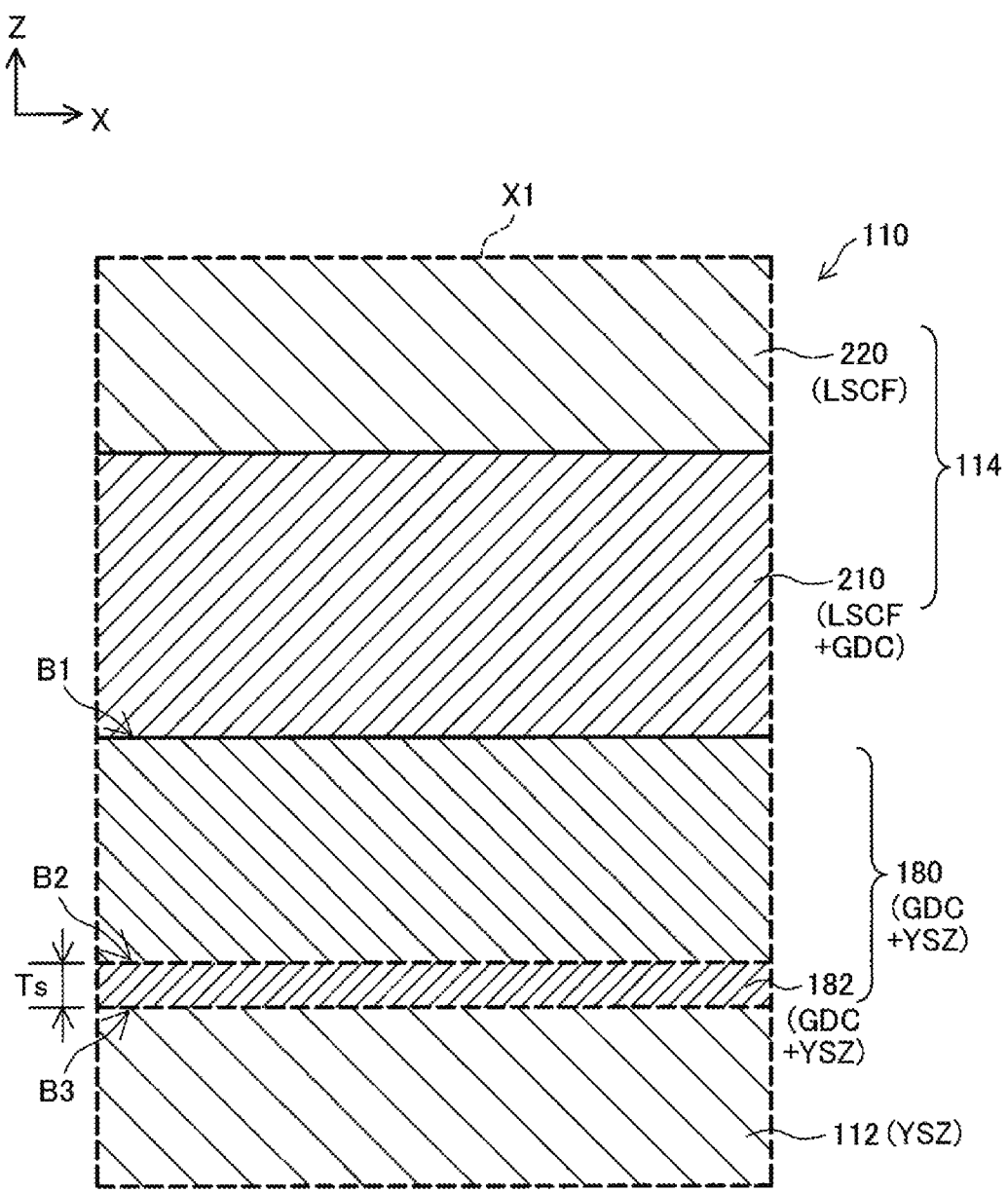
FIG. 6 Explanatory view showing the specific structure of a portion of a single cell 110 around an intermediate layer 180.

A-3. Specific Structure of Portion of Single Cell 110 Around Intermediate Layer 180:

FIG. 6 is an explanatory view showing the specific structure of a portion of the single cell 110 around the intermediate layer 180. FIG. 6 illustrates an XZ section of the single cell 110 in a region (region X1 in FIG. 4) including a portion of the electrolyte layer 112 and a portion of the cathode 114 with the intermediate layer 180 intervening therebetween.

In the present embodiment, the single cell 110 includes the intermediate layer 180 containing GDC and YSZ and disposed between (the active layer 210) of the cathode 114 containing LSCF and the electrolyte layer 112 containing YSZ. The intermediate layer 180 includes a solid solution layer 182. The solid solution layer 182 is formed through, for example, interdiffusion between the intermediate layer 180 and the electrolyte layer 112 during firing of the intermediate layer 180. The solid solution layer 182 is present in a region of the intermediate layer 180 adjacent to the boundary between the intermediate layer 180 and the electrolyte layer 112. The solid solution layer 182, which is formed through interdiffusion between the intermediate layer 180 and the electrolyte layer 112, contains GDC and YSZ. Thus, the solid solution layer 182 contains Gd (gadolinium), Ce (cerium), and Zr.

In the single cell 110, SZO (i.e., a substance of high resistance) is generated through diffusion of Sr contained in the cathode 114 toward the electrolyte layer 112 and reaction between the diffused Sr and Zr during, for example, firing of the cathode 114 or electricity generation operation. The generation of SZO causes an increase in the electric resistance of the single cell 110, resulting in impairment of electricity generation performance. The intermediate layer 180 prevents diffusion of Sr from the cathode 114 toward the electrolyte layer 112, thereby preventing generation of SZO.

A-4. Performance Evaluation:

The single cell 110 forming the fuel cell stack 100 of the present embodiment is characterized by the amount of SZO and the thickness Ts of the solid solution layer 182. Next will be described the performance evaluation carried out by using a plurality of samples of the single cell 110 with different SZO amounts and different thicknesses Ts of the solid solution layer 182.

FIG. 7 is an explanatory table showing the results of the performance evaluation. As shown in FIG. 7, the samples exhibit different SZO amounts and different thicknesses Ts of the solid solution layer 182. In the performance evaluation, the amount of SZO contained in the single cell 110 is indicated by "SZO ($SrZrO_3$) integrated value Vs." A larger SZO integrated value Vs indicates a larger amount of SZO contained in the single cell 110. The SZO integrated value Vs is calculated as detailed in "A-5. Method for analysis of single cell 110."

A-4-1. Method for Producing Single Cell 110:

Each sample of the single cell 110 was produced by the method described below. The performance evaluation involved the use of a plurality of samples of the single cell 110 with different SZO integrated values Vs and different thicknesses Ts of the solid solution layer 182. During production of these samples, the Zr content of the intermediate layer 180 is adjusted to fall within a range of 0.015 to 1 (wt %), and the intermediate layer 180 and the cathode 114 are fired at different temperatures.

(Formation of Laminate of Electrolyte Layer 112 and Anode 116)

YSZ powder is mixed with a butyral resin, dioctyl phthalate (DOP) serving as a plasticizer, a dispersant, and a solvent mixture of toluene and ethanol by means of a ball mill, to thereby prepare a slurry. The resultant slurry is formed into a thin film by means of doctor blading, to thereby prepare a green sheet for an electrolyte layer having a thickness of, for example, about 10 μm. NiO powder is weighed (55 parts by mass in terms of Ni) and mixed with YSZ powder (45 parts by mass), to thereby prepare a powder mixture. The powder mixture is mixed with a butyral resin, DOP serving as a plasticizer, a dispersant, and a solvent mixture of toluene and ethanol by means of a ball mill, to thereby prepare a slurry. The resultant slurry is formed into a thin film by means of doctor blading, to thereby prepare a green sheet for an anode having a thickness of, for example, 270 μm. The green sheet for an electrolyte layer and the green sheet for an anode are attached together and dried, followed by firing at, for example, 1,400° C., to thereby prepare a laminate of the electrolyte layer 112 and the anode 116.

(Formation of Intermediate Layer 180)

YSZ powder (8YSZ) is added to GDC powder (Ce:Gd=8:2 (ratio by mole)) so that the Zr content of the intermediate layer 180 falls within a range of 0.015 to 1 (wts), followed by dispersion mixing by use of highly pure zirconia cobble for 60 hours. This dispersion mixing is performed so that the BET specific surface area of the resultant powder mixture becomes a predetermined value determined for each sample within a range of 13 to 23 m$^2$/g. The powder mixture is mixed with poly(vinyl alcohol) serving as an organic binder and butyl carbitol serving as an organic solvent, and then the viscosity of the mixture is adjusted, to thereby prepare a paste for an intermediate layer. The paste for an intermediate layer is applied, by means of screen printing, onto the surface of the electrolyte layer 112 of the aforementioned laminate (composed of the electrolyte layer 112 and the anode 116), followed by firing at 1,100° C. to 1,400° C. for each sample. Thus, the intermediate layer 180 is formed to thereby prepare a laminate of the intermediate layer 180, the electrolyte layer 112, and the anode 116. During the firing of the intermediate layer 180, interdiffusion occurs between the intermediate layer 180 and the electrolyte layer 112, to thereby form the solid solution layer 182 in a region of the intermediate layer 180 adjacent to the boundary between the intermediate layer 180 and the electrolyte layer 112.

(Formation of Cathode 114)

LSCF powder, GDC powder, alumina powder, poly(vinyl alcohol) serving as an organic binder, and butyl carbitol serving as an organic solvent are mixed together, and the viscosity of the mixture is adjusted, to thereby prepare a paste for a cathode active layer. The paste for a cathode active layer is applied, by means of screen printing, onto the surface of the intermediate layer 180 of the aforementioned laminate (composed of the intermediate layer 180, the electrolyte layer 112, and the anode 116) and then dried. LSCF powder, alumina powder, poly(vinyl alcohol) serving as an organic binder, and butyl carbitol serving as an organic solvent are mixed together, and the viscosity of the mixture is adjusted, to thereby prepare a paste for a cathode current collecting layer. The paste for a cathode current collecting layer is applied onto the paste for a cathode active layer by means of screen printing and then dried, followed by firing for each sample (specifically, firing at 1,100° C. for samples S1 to S10, and firing at 1,000° C. for sample S11). Thus, the active layer 210 and the current collecting layer 220 of the cathode 114 are formed. The single cell 110 having the aforementioned structure is produced through the above-described process.

A-4-2. Evaluation Item and Evaluation Method:

The present performance evaluation involved examination of the adhesion of the cathode 114 and the electricity generation performance of the single cell 110.

(Evaluation of Adhesion of Cathode 114)

In each sample of the single cell 110, a commercially available cellophane tape was attached to the surface of the cathode 114 and then detached, and a determination was made as to whether the cathode 114 separated or not.

(Evaluation of Electricity Generation Performance of Single Cell 110)

The initial voltage of each sample of the single cell 110 was measured at a current density of 0.55 A/cm$^2$ under the following conditions: temperature: 700° C., atmosphere: hydrogen (320 mL), and dew-point temperature: 30° C.

(Determination)

A sample was determined to be unacceptable (X) in the case where separation of the cathode 114 occurred in the evaluation of the adhesion of the cathode 114, or the initial voltage was less than 0.90 V in the evaluation of the electricity generation performance of single cell 110. The sample was determined to be acceptable (O) in the other cases.

(Results of Performance Evaluation)

As shown in FIG. 7, sample S11 was determined to be unacceptable because of occurrence of separation of the cathode 114. The firing temperature of the cathode 114 (1,000° C.) in sample S11 is lower than that in the other samples, and thus diffusion of Sr contained in the cathode 114 is reduced, resulting in a very small SZO integrated value Vs. However, the low firing temperature of the cathode 114 in sample S11 probably causes weak bonding between the cathode 114 and the intermediate layer 180, resulting in separation of the cathode 114. Thus, the SZO integrated value Vs is preferably larger than 209. No separation of the cathode 114 occurred in the other samples.

Figure 8:
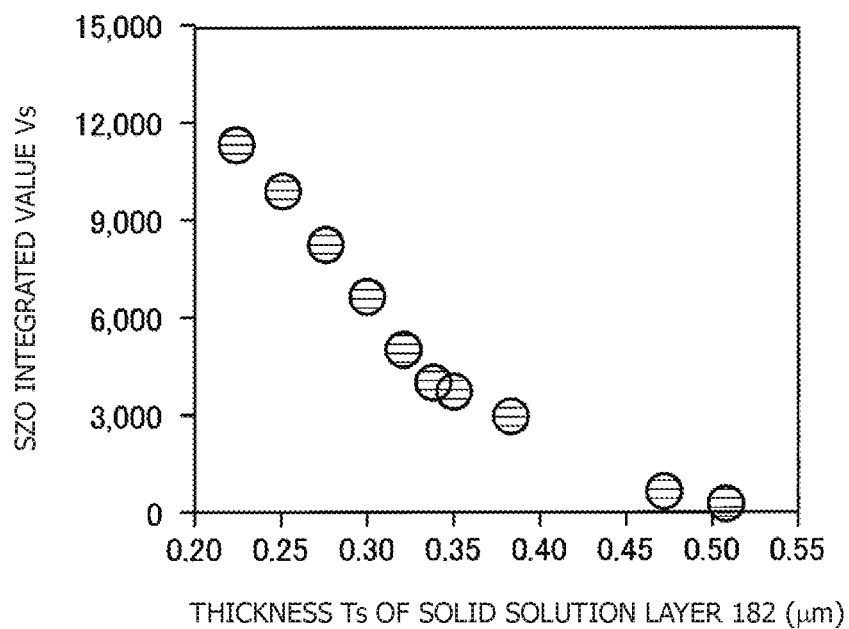
FIG. 8 Explanatory graph showing the relationship between SZO integrated value Vs and the thickness Ts of a solid solution layer 182 in samples.
Figure 9:
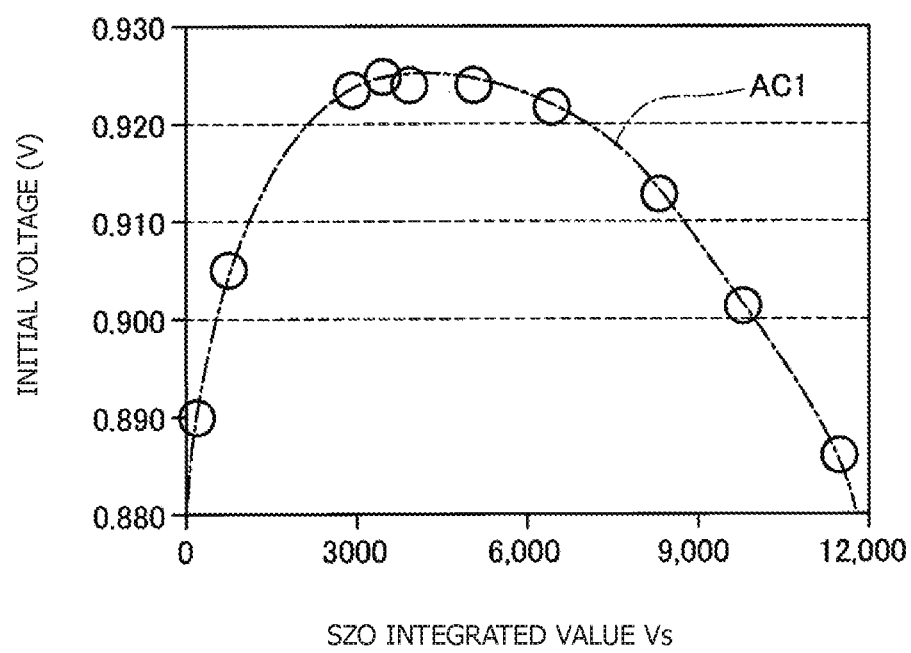
FIG. 9 Explanatory graph showing the relationship between SZO integrated value Vs and initial voltage.
Figure 10:
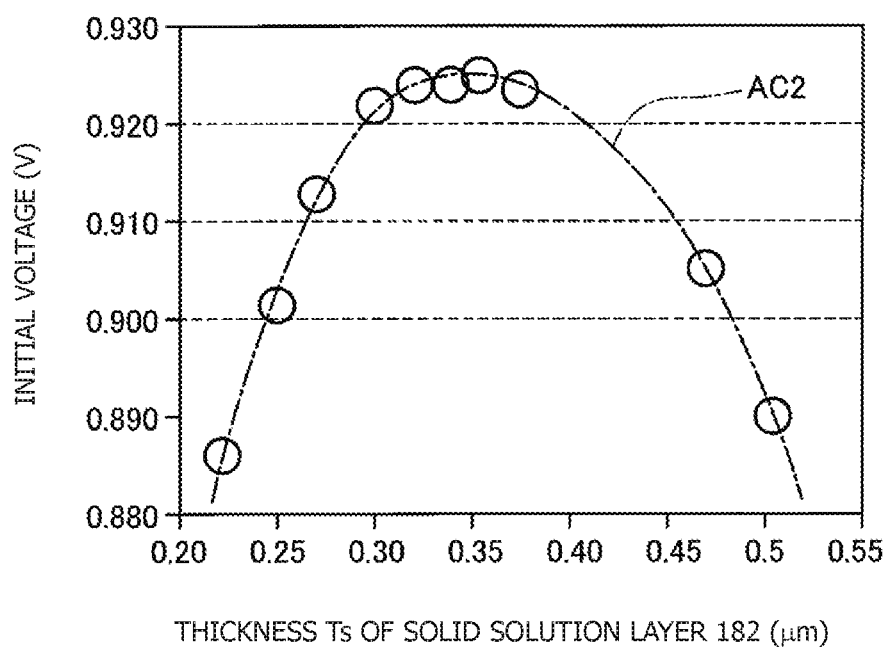
FIG. 10 Explanatory graph showing the relationship between the thickness Ts of the solid solution layer 182 and initial voltage.

Samples S1 and S10 were determined to be unacceptable because of an initial voltage of less than 0.90 V. Conceivably, samples S1 and S10 exhibited low initial voltages for the following reasons. FIG. 8 is an explanatory graph showing the relationship between SZO integrated value Vs and the thickness Ts of the solid solution layer 182 in samples (except for sample S11, the same shall apply in FIGS. 9 and 10). FIG. 9 is an explanatory graph showing the relationship between SZO integrated value Vs and initial voltage. FIG. 10 is an explanatory graph showing the relationship between the thickness Ts of the solid solution layer 182 and initial voltage.

An increase in the firing temperature of the intermediate layer 180 led to an increase in the thickness Ts of the solid solution layer 182. This is probably attributed to the fact that the higher the firing temperature of the intermediate layer 180, the greater the degree of promotion of interdiffusion between the intermediate layer 180 and the electrolyte layer 112. An increase in the firing temperature of the intermediate layer 180 led to a decrease in SZO integrated value Vs. This is probably attributed to the fact that the higher the firing temperature of the intermediate layer 180, the greater the thickness Ts of the solid solution layer 182 (i.e., the greater the effect of the solid solution layer 182 in preventing diffusion of Sr from the cathode 114). As shown in the results of FIG. 8, the smaller the thickness Ts of the solid solution layer 182, the larger the SZO integrated value Vs, whereas the larger the thickness Ts of the solid solution layer 182, the smaller the SZO integrated value Vs.

As shown in FIG. 9, an SZO integrated value Vs falling within a specific range led to a high initial voltage, whereas an SZO integrated value Vs below or above the range led to a low initial voltage. As shown in FIG. 10, a thickness Ts of the solid solution layer 182 falling within a specific range led to a high initial voltage, whereas a thickness Ts of the solid solution layer 182 below or above the range led to a low initial voltage. The reason for this is probably as follows. Excessively large SZO integrated value Vs (i.e., excessively small thickness Ts of the solid solution layer 182) leads to low electric resistance of the solid solution layer 182 but very high electric resistance caused by SZO, resulting in high electric resistance of the single cell 110. In contrast, excessively small SZO integrated value Vs (i.e., excessively large thickness Ts of the solid solution layer 182) leads to low electric resistance caused by SZO but very high electric resistance of the solid solution layer 182, resulting in high electric resistance of the single cell 110.

As shown in FIG. 7, in sample S1, the thickness Ts of the solid solution layer 182 was very large. Thus, in sample S1, the solid solution layer 182 exhibited very high electric resistance, and the single cell 110 exhibited high electric resistance. This probably causes low initial voltage. In sample S10, the thickness Ts of the solid solution layer 182 was very small, resulting in very large SZO integrated value Vs. Thus, in sample S10, SZO caused very high electric resistance, and the single cell 110 exhibited high electric resistance. This probably causes low initial voltage.

In contrast, in samples S2 to S9, the initial voltage was 0.90 V or more, and no separation of the cathode 114 occurred as described above. Thus, samples S2 to S9 were determined to be acceptable. In samples S2 to S9, the SZO integrated value Vs and the thickness Ts of the solid solution layer 182 fall within ranges so as to achieve a good balance between low electric resistance caused by SZO and low electric resistance of the solid solution layer 182. This probably causes low electric resistance of the single cell 110 and prevents a decrease in initial voltage.

In sample S8, the initial voltage was 0.91 V or more; i.e., particularly preferred electricity generation performance was achieved. Thus, in sample S8, the SZO integrated value Vs and the thickness Ts of the solid solution layer 182 fall within particularly preferred ranges. In samples S3 to S7, the initial voltage was 0.92 V or more; i.e., further preferred electricity generation performance was achieved. Thus, in samples S3 to S7, the SZO integrated value Vs and the thickness Ts of the solid solution layer 182 fall within still more preferred ranges.

In the graph (FIG. 9) showing the relationship between SZO integrated value Vs and initial voltage obtained through the aforementioned results of performance evaluation, intersection points between an approximate curve AC1 prepared by plotting of data and each of horizontal lines corresponding to initial voltages of 0.90, 0.91, and 0.92 V indicate the following relations: the initial voltage is 0.90 V or more when the SZO integrated value Vs falls within a range of 600 to 10,300; the initial voltage is 0.91 V or more when the SZO integrated value Vs falls within a range of 1,600 to 9,200; and the initial voltage is 0.92 V or more when the SZO integrated value Vs falls within a range of 3,100 to 7,800. Thus, the SZO integrated value Vs preferably falls within a range of 600 to 10,300, since impairment of electricity generation performance can be prevented while preventing separation between the intermediate layer 180 and the cathode 114. The SZO integrated value Vs more preferably falls within a range of 1,600 to 9,200, since impairment of electricity generation performance can be effectively prevented while preventing separation between the intermediate layer 180 and the cathode 114. The SZO integrated value Vs still more preferably falls within a range of 3,100 to 7,800, since impairment of electricity generation performance can be more effectively prevented while preventing separation between the intermediate layer 180 and the cathode 114.

In the graph (FIG. 10) showing the relationship between the thickness Ts of the solid solution layer 182 and initial voltage obtained through the aforementioned results of performance evaluation, intersection points between an approximate curve AC2 prepared by plotting of data and each of horizontal lines corresponding to initial voltages of 0.90, 0.91, and 0.92 V indicate the following relations: the initial voltage is 0.90 V or more when the thickness Ts of the solid solution layer 182 falls within a range of 0.246 μm to 0.482 μm; the initial voltage is 0.91 V or more when the thickness Ts of the solid solution layer 182 falls within a range of 0.271 μm to 0.457 μm; and the initial voltage is 0.92 V or more when the thickness Ts of the solid solution layer 182 falls within a range of 0.307 μm to 0.422 μm. Thus, the thickness Ts of the solid solution layer 182 preferably falls within a range of 0.246 μm to 0.482 μm, since an increase in the thickness Ts of the solid solution layer 182 to a certain extent can prevent impairment of electricity generation performance caused by SZO while preventing impairment of electricity generation performance due to an excessive increase in the thickness Ts of the solid solution layer 182 of high resistance. The thickness Ts of the solid solution layer 182 more preferably falls within a range of 0.271 μm to 0.457 μm, since an increase in the thickness Ts of the solid solution layer 182 to a certain extent can effectively prevent impairment of electricity generation performance caused by SZO while effectively preventing impairment of electricity generation performance due to an excessive increase in the thickness Ts of the solid solution layer 182 of high resistance. The thickness Ts of the solid solution layer 182 still more preferably falls within a range of 0.307 μm to 0.422 μm, since an increase in the thickness Ts of the solid solution layer 182 to a certain extent can more effectively prevent impairment of electricity generation performance caused by SZO while more effectively preventing impairment of electricity generation performance due to an excessive increase in the thickness Ts of the solid solution layer 182 of high resistance.

Figure 11:
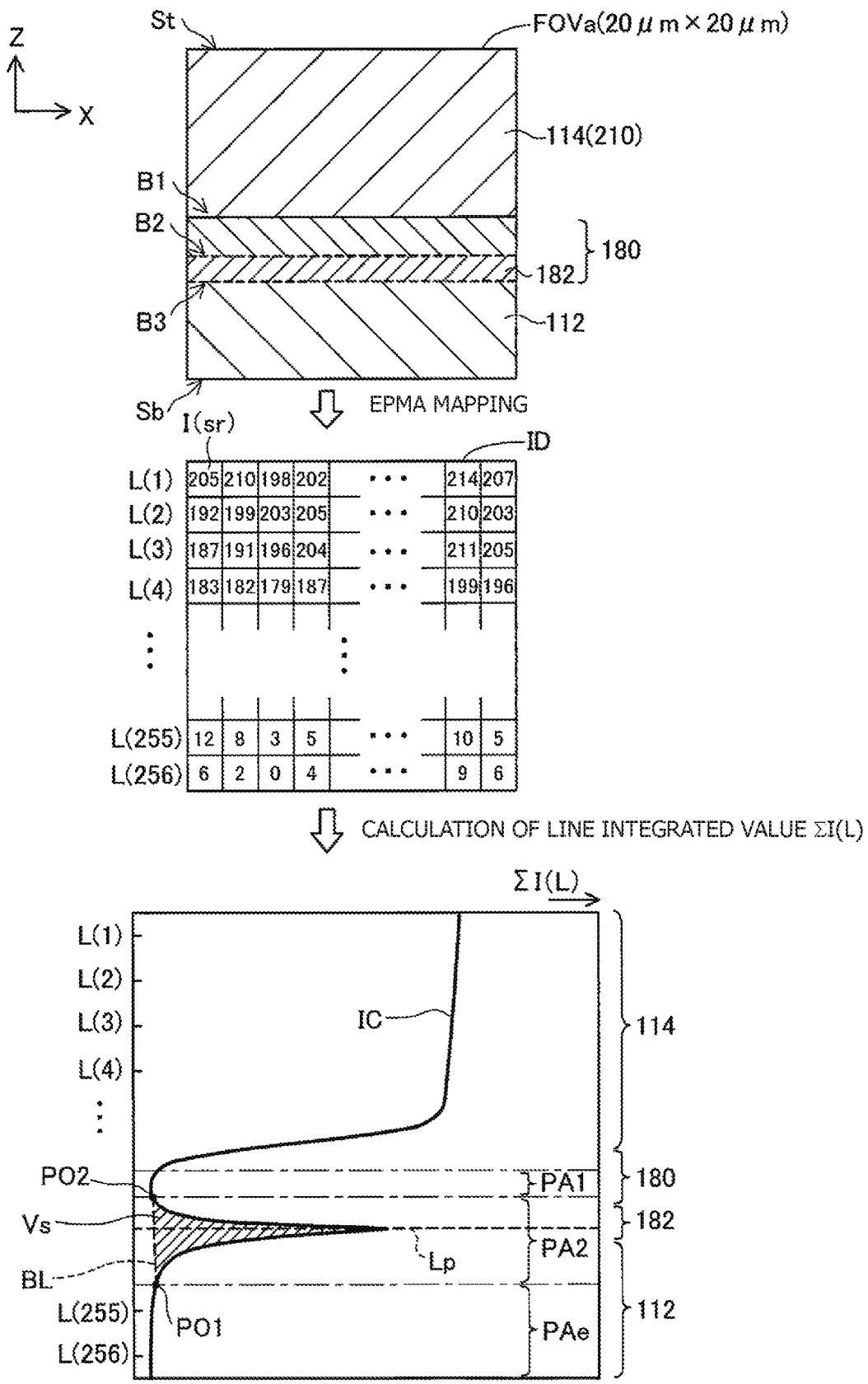
FIG. 11 Explanatory illustration showing a method for calculation of SZO integrated value Vs.

A-5. Method for Analysis of Single Cell 110:

A-5-1. Method for Calculation of SZO Integrated Value Vs:

The aforementioned SZO integrated value Vs, which is an index of the amount of SZO, is calculated as described below. FIG. 11 is an explanatory illustration showing a method for calculation of SZO integrated value Vs.

As shown in the upper part of FIG. 11, in the single cell 110 used for calculation of SZO integrated value Vs, a cross section parallel to the Z-axis direction (e.g., an XZ section) is exposed, and a 20 μm×20 μm rectangular field of view FOVa is determined in the exposed cross section. The rectangular field of view FOVa is determined so as to include at least a portion of the cathode 114 in the first direction (Z-axis direction), the intermediate layer 180, and at least a portion of the electrolyte layer 112 in the first direction (i.e., so as to include the boundary B1 between the cathode 114 and the intermediate layer 180 and the boundary B3 between the intermediate layer 180 and the electrolyte layer 112). Also, the rectangular field of view FOVa is determined such that two sides (top side St and bottom side Sb) of the four sides forming the rectangular field of view FOVa are approximately parallel to the boundary B3 between the intermediate layer 180 and the electrolyte layer 112. As used herein, the term "approximately parallel" refers to the case where two lines (or two faces) form an angle X (0°≤X≤90°) of 20 or less, and the term "approximately orthogonal" refers to the case where two lines (or two faces) form an angle X of 88° or more.

Subsequently, as shown in the middle part of FIG. 11, the rectangular field of view FOVa is divided into 256×256 pixels, and Sr intensity mapping data ID representing Sr intensities I (sr) in the pixels are generated by means of EPMA (electron probe micro analyzer) mapping. In the EPMA mapping, the peak intensities of Sr characteristic X-rays are measured in count units by means of, for example, FE-EPMA JXA-8500F (manufactured by JEOL Ltd.) (electron beams applied to a measurement sample are accelerated at 15 kV) under the following conditions: irradiation current: 20 nA, mapping area: 20 μm square, 256 pixels×256 pixels. The measuring time for characteristic X-rays is 30 milliseconds in each pixel. PETH is used as a dispersive crystal for isolation of Sr characteristic X-ray.

Subsequently, an Sr intensity line integrated value $\Sigma I(L)$, which is the integrated value of Sr intensities I (sr) in pixels, is calculated in each of 256 pixel lines L(n) (L(1) to L(256)) approximately orthogonal to the Z-axis direction in the Sr intensity mapping data ID. Then, an Sr intensity curve IC exhibiting Sr intensities at different positions in the Z-axis direction is obtained as exemplified in the lower part of FIG. 11, in which the horizontal axis shows the Sr intensity line integrated value $\Sigma I(L)$ and the vertical axis shows the position of each pixel line L(n). The Sr intensity curve IC is obtained by plotting the Sr intensity line integrated value $\Sigma I(L)$ against each pixel line L(n). The Sr intensity curve IC is a curve smoothly connecting 256 points corresponding to the Sr intensity line integrated values $\Sigma I(L)$ of the 256 pixel lines L(n).

As described above, the cathode 114 is formed so as to contain LSCF, and thus the cathode 114 contains Sr in an amount larger than that of Sr contained in the material for forming the electrolyte layer 112 or the intermediate layer 180. Thus, as shown in the lower part of FIG. 11, the Sr intensity line integrated value $\Sigma I(L)$ indicated by the Sr intensity curve IC is large in the cathode 114 position (upper position). In this position, Sr is probably present mainly in the form of LSCF. As described above, the diffusion of Sr contained in the cathode 114 toward the electrolyte layer 112 causes reaction between the diffused Sr and Zr contained in the electrolyte layer 112, to thereby generate SZO. Thus, the Sr intensity line integrated value $\Sigma I(L)$ indicated by the Sr intensity curve IC decreases to a low level from the cathode 114 position toward the electrolyte layer 112 side (lower side), increases again from the low level to a high level, and then decreases from the high level to a low level. Conceivably, Sr is present mainly in the form of SZO in a portion where "the Sr intensity line integrated value increases again from the low level to a high level." Thus, the Sr intensity in this position probably correlates with the amount of SZO. Therefore, the SZO integrated value Vs, which is an index of the amount of SZO, is calculated as described below.

Specifically, an electrolyte layer integrated value portion PAe, a first integrated value portion PA1, and a second integrated value portion PA2 are specified in the Sr intensity curve IC. The electrolyte layer integrated value portion PAe exhibits the Sr intensity line integrated value $\Sigma I(L)$ of a portion of the electrolyte layer 112 having an approximately uniform and small Sr intensity line integrated value $\Sigma I(L)$.

Thus, the electrolyte layer integrated value portion PAe corresponds to a small Sr intensity line integrated value $\Sigma I(L)$ portion (trough) in the lowermost portion of the Sr intensity curve IC shown in the lower part of FIG. 11. The first integrated value portion PA1 exhibits an Sr intensity line integrated value $\Sigma I(L)$ approximately equal to the Sr intensity line integrated value $\Sigma I(L)$ of the electrolyte layer integrated value portion PAe. Thus, the first integrated value portion PA1 corresponds to a small Sr intensity line integrated value $\Sigma I(L)$ portion (trough) at a position (just below the cathode 114) of the Sr intensity curve IC shown in the lower part of FIG. 11. The expression "two Sr intensity line integrated values $\Sigma I(L)$ are approximately equal to each other" refers to the case where one of the Sr intensity line integrated values $\Sigma I(L)$ is 90% to 110% of the other Sr intensity line integrated value $\Sigma I(L)$. The second integrated value portion PA2 is located between the electrolyte layer integrated value portion PAe and the first integrated value portion PA1 and exhibits an Sr intensity line integrated value $\Sigma I(L)$ larger than the Sr intensity line integrated value $\Sigma I(L)$ of the electrolyte layer integrated value portion PAe. Thus, the second integrated value portion PA2 corresponds to a peak portion sandwiched between the two troughs (i.e., the electrolyte layer integrated value portion PAe and the first integrated value portion PA1) of the Sr intensity curve IC shown in the lower part of FIG. 11.

In the above-specified second integrated value portion PA2, a peak pixel line Lp is specified which is a pixel line L(n) at which the Sr intensity line integrated value $\Sigma I(L)$ is maximum. In the second integrated value portion PA2, a first point PO1 and a second point PO2 are also specified, wherein the first point PO1 corresponds to the minimum Sr intensity line integrated value $\Sigma I(L)$ on the electrolyte layer 112 side with respect to the peak pixel line Lp, and the second point PO2 corresponds to the minimum Sr intensity line integrated value $\Sigma I(L)$ on the cathode 114 side with respect to the peak pixel line Lp. A straight base line BL is drawn by connecting the first point PO1 and the second point PO2, and the area of a region surrounded by the base line BL and the second integrated value portion PA2 of the Sr intensity curve IC (i.e., a hatched region in the lower part of FIG. 11) is calculated as the SZO integrated value Vs in the rectangular field of view FOVa.

In the aforementioned cross section of the single cell 110, 10 rectangular fields of view FOVa are determined such that they do not overlap with one another, and the SZO integrated value Vs is calculated in each rectangular field of view FOVa as described above. Finally, the average of the SZO integrated values Vs in the rectangular fields of view FOVa is defined as the SZO integrated value Vs of the single cell 110.

Figure 12:
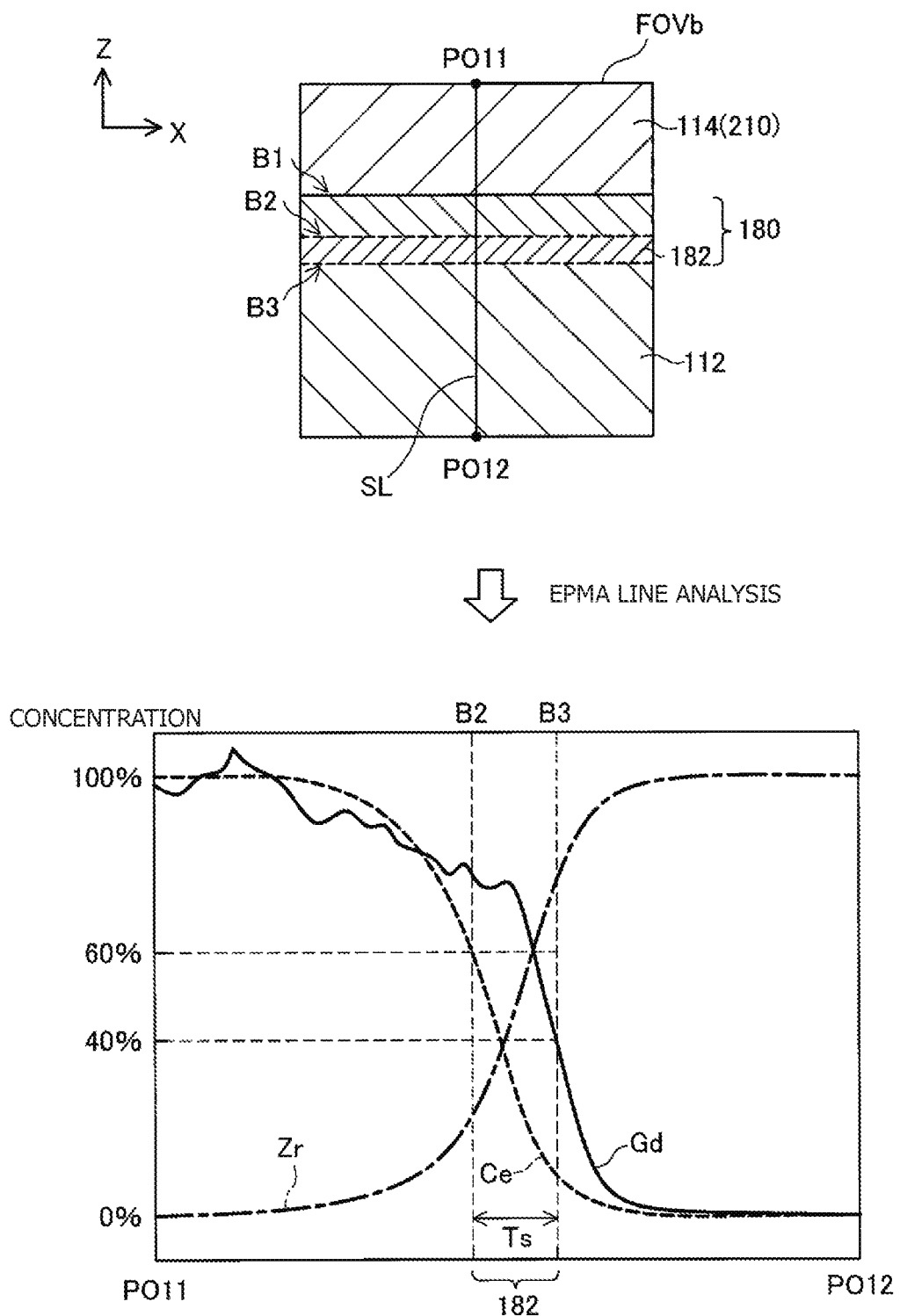
FIG. 12 Explanatory view showing a method for determination of the thickness Ts of the solid solution layer 182.

A-5-2. Method for Determination of Thickness Ts of Solid Solution Layer 182:

The thickness Ts of the solid solution layer 182 is determined as described below. FIG. 12 is an explanatory view showing a method for determination of the thickness Ts of the solid solution layer 182.

As shown in the upper part of FIG. 12, in the single cell 110 used for determination of the thickness Ts of the solid solution layer 182, a cross section parallel to the Z-axis direction (e.g., an XZ section) is exposed, and a rectangular field of view FOVb is determined in the exposed cross section. The rectangular field of view FOVb is appropriately determined such that the center of the field of view FOVb is located at a position assumed to be the boundary B3 between the electrolyte layer 112 and the intermediate layer 180. In the rectangular field of view FOVb, a line segment SL is determined so as to be approximately orthogonal to the boundary B3. The line segment SL intersects with the outer periphery of the rectangular field of view FOVb. The intersection point on the cathode 114 side (upper side) is called intersection point PO11, and the intersection point on the electrolyte layer 112 side (lower side) is called intersection point PO12.

Subsequently, the line segment SL is divided into 500 pixels, and intensity data exhibiting Gd (or Sm, the same shall apply hereinafter) and Ce intensities in the pixels are prepared by means of EPMA mapping. In the EPMA mapping, the peak intensities of Gd and Ce characteristic X-rays are measured in count units by means of, for example, FE-EPMA JXA-8500F (manufactured by JEOL Ltd.) (electron beams applied to a measurement sample are accelerated at 15 kV) under the following conditions: irradiation current: 20 nA, line length: 3.61 µm, 500 pixels. The measuring time for characteristic X-rays is 500 milliseconds in each pixel. LIFH is used as a dispersive crystal for isolation of Gd characteristic X-ray, and PET is used as a dispersive crystal for isolation of Ce characteristic X-ray.

Subsequently, the Gd and Ce intensity data are smoothed (10-point average). In each of the smoothed Gd and Ce intensity data, the average of the intensities in the first to 61st pixels of the 500 pixels on the line segment SL is defined to correspond to a concentration of 100%, and the average of the intensities in the 406th to 491st pixels of the 500 pixels on the line segment SL is defined to correspond to a concentration of 0%. On the basis of this definition, the intensity in each pixel is converted into a concentration.

The lower part of FIG. 12 shows exemplary Gd and Ce concentrations obtained through the conversion. For reference, the lower part of FIG. 12 also shows Zr concentration. In the graph showing the concentrations, the position at which the Ce concentration is 60% is defined as the boundary B2 on the upper side (the cathode 114 side) of the solid solution layer 182, and the position at which the Gd concentration is 40% is defined as the boundary B3 on the lower side (the electrolyte layer 112 side) of the solid solution layer 182. The distance between the boundary B2 and the boundary B3 is determined as the thickness Ts of the solid solution layer 182 in the rectangular field of view FOVb.

In the aforementioned cross section of the single cell 110, 10 rectangular fields of view FOVb are determined such that they do not overlap with one another, and the thickness Ts of the solid solution layer 182 is determined in each rectangular field of view FOVb as described above. Finally, the average of the thicknesses Ts of the solid solution layer 182 in the rectangular fields of view FOVb is defined as the thickness Ts of the solid solution layer 182 of the single cell 110.

B. Modifications

The technique disclosed in the present specification is not limited to the above embodiment, but may be modified into various other forms without departing from the gist thereof. For example, the technique may be modified as described below.

The configuration of the single cell 110 or the fuel cell stack 100 in the above embodiment is a mere example, and may be modified into various forms. For example, in the above embodiment, the cathode 114 has a two-layer structure including the active layer 210 and the current collecting layer 220. However, the cathode 114 may include an additional layer besides the active layer 210 and the current collecting layer 220, or the cathode 114 may have a single-layer structure. In the above embodiment, the number of the single cells 110 included in the fuel cell stack 100 is a mere example and is determined as appropriate in accordance with, for example, a required output voltage of the fuel cell stack 100.

In the above embodiment, materials used for forming the members are provided merely by way of example. Other materials may be used for forming the members. For example, the electrolyte layer 112 contains YSZ in the above embodiment. So long as the electrolyte layer 112 contains Zr and at least one of Y, Sc (scandium), and Ca (calcium), the electrolyte layer 112 may contain, for example, a material such as ScSZ (scandia-stabilized zirconia) or CaSZ (calcium oxide-stabilized zirconia) in place of or in addition to YSZ. In the above embodiment, the cathode 114 (the active layer 210 and the current collecting layer 220) contains LSCF. So long as the cathode 114 contains Sr and Co, the cathode 114 may contain another material in place of or in addition to LSCF. In the above embodiment, a portion of the intermediate layer 180 other than the solid solution layer 182 contains GDC and YSZ. A portion of the intermediate layer 180 other than the solid solution layer 182 may contain, for example, a material such as SDC (samarium-doped ceria) in place of or in addition to GDC, and may contain, for example, a material such as ScSZ or CaSZ in place of or in addition to YSZ. Since the solid solution layer 182 is formed through interdiffusion between the intermediate layer 180 and the electrolyte layer 112, the material forming the solid solution layer 182 may vary depending on the materials forming the intermediate layer 180 and the electrolyte layer 112. Specifically, the solid solution layer 182 is formed so as to contain at least one of Gd and Sm (samarium), Ce, and Zr.

In the above embodiment, the SZO integrated value Vs or the thickness Ts of the solid solution layer 182 does not necessarily fall within the aforementioned preferred range in all the single cells 110 included in the fuel cell stack 100. So long as the SZO integrated value Vs or the thickness Ts of the solid solution layer 182 falls within the aforementioned preferred range in at least one single cell 110 included in the fuel cell stack 100, impairment of electricity generation performance can be prevented while preventing separation between the intermediate layer 180 and the cathode 114 in the single cell 110.

Figure 13:
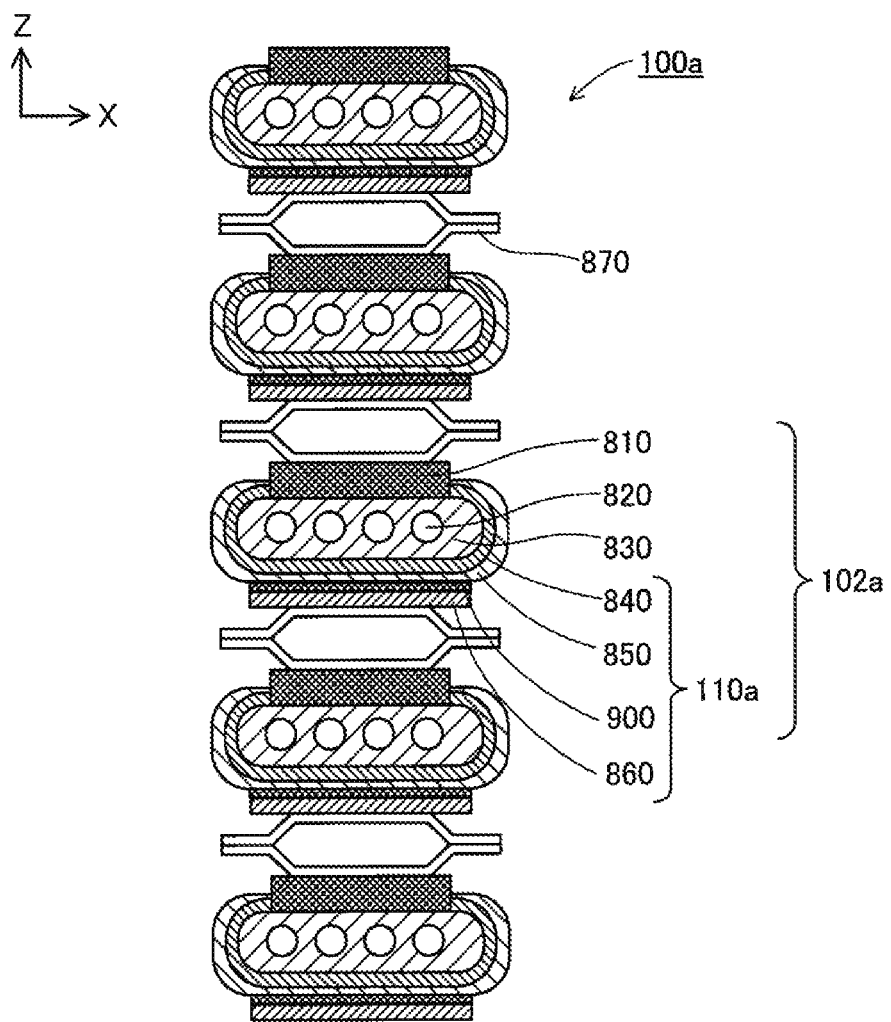
FIG. 13 Explanatory view schematically showing the structure of a fuel cell stack 100a according to a modification.

In the above embodiment, the fuel cell stack 100 includes a plurality of single cells 110 having a flat-plate shape. The present invention is also applicable to another configuration, for example, a fuel cell stack 100a including a plurality of approximately cylindrical single cells 110a as disclosed in International Patent Publication WO 2012/165409. FIG. 13 is an explanatory view schematically showing the structure of a fuel cell stack 100a according to a modification. As shown in FIG. 13, the fuel cell stack 100a according to the modification includes a plurality of electricity generation units 102a disposed at predetermined intervals in the Z-axis direction. The electricity generation units 102a are connected electrically in series through current collecting members 870 each intervening between two adjacent electricity generation units 102a. Each electricity generation unit 102a has a flattened columnar external appearance and includes an electrode support 830, a single cell 110a, and an interconnector 810. The single cell 110a includes an anode 840, an electrolyte layer 850, a cathode 860, and an intermediate layer 900. The Z-axis direction in the modification shown in FIG. 13 corresponds to the first direction appearing in CLAIMS.

The electrode support 830 is a columnar body having an approximately elliptical cross section and is formed of a porous material. The electrode support 830 has in the interior thereof a plurality of fuel gas flow channels 820 extending in the longitudinal direction of the columnar body. The anode 840 is disposed so as to partially cover the side surface of the electrode support 830. Specifically, the anode 840 covers one of the paired parallel flat surfaces of the electrode support 830 and two curved surfaces thereof connecting the ends of the flat surfaces. The electrolyte layer 850 is disposed so as to cover the entire side surface of the anode 840. The cathode 860 is disposed so as to cover a region of the side surface of the electrolyte layer 850, the region being located on the flat surface of the electrode support 830. The intermediate layer 900 is disposed between the electrolyte layer 850 and the cathode 860. A solid solution layer (not shown) formed through interdiffusion between the intermediate layer 900 and the electrolyte layer 850 is present in a region of the intermediate layer 900 adjacent to the boundary between the intermediate layer 900 and the electrolyte layer 850. The interconnector 810 is disposed on the flat surface of the electrode support 830 on which the anode 840 and the electrolyte layer 850 are not disposed. Each current collecting member 870 electrically connects the cathode 860 of one electricity generation unit 102a to the interconnector 810 of another adjacent electricity generation unit 102a. An oxidizer gas is supplied to the outside of the cathode 860, and a fuel gas is supplied to the fuel gas flow channels 820 formed in the electrode support 830. Electricity is generated in the fuel cell stack 100a when it is heated to a predetermined operation temperature.

In the fuel cell stack 100a having the aforementioned configuration, the SZO integrated value Vs preferably falls within a range of 600 to 10,300 in at least one single cell 110a as in the case of the above embodiment, since impairment of electricity generation performance can be prevented while preventing separation between the intermediate layer 900 and the cathode 860. Also, the solid solution layer preferably has a thickness of 0.246 μm to 0.482 μm, since an increase in the thickness of the solid solution layer to a certain extent can prevent impairment of electricity generation performance caused by SZO while preventing impairment of electricity generation performance due to an excessive increase in the thickness of the solid solution layer of high resistance.

The above embodiment refers to an SOFC for generating electricity by utilizing the electrochemical reaction between hydrogen contained in a fuel gas and oxygen contained in an oxidizer gas; however, the present invention is also applicable to an electrolysis single cell which is the constitutive unit of a solid oxide electrolysis cell (SOEC) for generating hydrogen by utilizing the electrolysis of water, and to an electrolysis cell stack including a plurality of electrolysis single cells. Since the structure of the electrolysis cell stack is publicly known as described in, for example, Japanese Patent Application Laid-Open (kokai) No. 2016-81813, detailed description of the structure is omitted. Schematically, the electrolysis cell stack has a structure similar to that of the fuel cell stack 100 in the above embodiment. That is, the fuel cell stack 100 in the above embodiment may be read as "electrolysis cell stack," the electricity generation unit 102 may be read as "electrolysis cell unit," and the single cell 110 may be read as "electrolysis single cell." However, in operation of the electrolysis cell stack, voltage is applied between the cathode 114 and the anode 116 such that the cathode 114 serves as a positive electrode, whereas the anode 116 serves as a negative electrode, and water vapor is supplied as a material gas through the communication hole 108. Thus, the electrolysis of water occurs in the electrolysis cell units, whereby hydrogen gas is generated in the anode chambers 176, and hydrogen is discharged to the outside of the electrolysis cell stack through the communication hole 108. In the electrolysis single cell and the electrolysis cell stack having the aforementioned configuration, if an intermediate layer is disposed between the electrolyte layer and the cathode, and the SZO integrated value Vs is adjusted to fall within a range of 600 to 10,300 as in the case of the above embodiment, performance impairment can be prevented while preventing separation between the intermediate layer and the cathode. If the thickness of a solid solution layer formed in a region of the intermediate layer adjacent to the boundary between the intermediate layer and the electrolyte layer is adjusted to be 0.246 μm to 0.482 μm, an increase in the thickness of the solid solution layer to a certain extent can prevent performance impairment caused by SZO while preventing performance impairment due to an excessive increase in the thickness of the solid solution layer of high resistance.

The above embodiment is described while referring to the solid oxide fuel cell (SOFC); however, the present invention is also applicable to other types of fuel cell (or electrolysis cell), such as a molten carbonate fuel cell (MCFC).

DESCRIPTION OF REFERENCE NUMERALS

22: bolt, 24: nut; 26: insulation sheet; 27: gas passage member; 28: body portion; 29: branch portion; 100: fuel cell stack; 102: electricity generation unit; 104: end plate; 106: end plate; 108: communication hole; 110: single cell; 112: electrolyte layer; 114: cathode; 116: anode; 120: separator; 121: hole; 124: bonding member; 130: cathode-side frame; 131: hole; 132: oxidizer gas supply communication hole; 133: oxidizer gas discharge communication hole; 134: cathode-side current collector; 135: current collector element; 140: anode-side frame; 141: hole; 142: fuel gas supply communication hole; 143: fuel gas discharge communication hole; 144: anode-side current collector; 145: electrode facing portion; 146: interconnector facing portion; 147: connection portion; 149: spacer; 150: interconnector; 161: oxidizer gas introduction manifold; 162: oxidizer gas discharge manifold; 166: cathode chamber; 171: fuel gas introduction manifold; 172: fuel gas discharge manifold; 176: anode chamber; 180: intermediate layer; 182: solid solution layer; 210: active layer; 220: current collecting layer; 810: interconnector; 820: fuel gas flow channel; 830: electrode support; 840: anode; 850: electrolyte layer; 860: cathode; 870: current collecting member; and 900: intermediate layer

The invention claimed is:

1. An electrochemical reaction single cell comprising an electrolyte layer containing Zr and at least one of Y, Sc, and Ca, an anode disposed on one side of the electrolyte layer in a first direction, a cathode containing Sr and Co and disposed on the other side of the electrolyte layer in the first direction, and an intermediate layer disposed between the electrolyte layer and the cathode, the electrochemical reaction single cell being characterized by exhibiting an $SrZrO_3$ integrated value of 600 to 10,300, the $SrZrO_3$ integrated value being calculated as follows:

a 20 μm×20 μm rectangular field of view in at least one cross section parallel to the first direction and including the cathode, the intermediate layer, and the electrolyte layer is divided into 256×256 pixels, wherein two sides of the four sides forming the rectangular field of view are approximately parallel to the boundary between the intermediate layer and the electrolyte layer, and Sr intensity mapping data representing Sr intensities in the pixels are generated by means of EPMA mapping;

an Sr intensity line integrated value, which is the integrated value of Sr intensities in pixels in each of 256 pixel lines, is calculated, wherein the pixel lines are approximately orthogonal to the first direction in the Sr intensity mapping data;

an intensity curve obtained by plotting the Sr intensity line integrated values against the pixel lines has an electrolyte layer integrated value portion exhibiting the Sr intensity line integrated value of a portion of the electrolyte layer having an approximately uniform Sr intensity line integrated value, a first integrated value portion exhibiting an Sr intensity line integrated value approximately equal to the Sr intensity line integrated value of the electrolyte layer integrated value portion, and a second integrated value portion located between the electrolyte layer integrated value portion and the first integrated value portion and exhibiting an Sr intensity line integrated value larger than the Sr intensity line integrated value of the electrolyte layer integrated value portion;

a straight base line is drawn by connecting a first point and a second point in the second integrated value portion, and the area of a region surrounded by the base line and the second integrated value portion is calculated as the $SrZrO_3$ integrated value, wherein the first point corresponds to the minimum Sr intensity line integrated value on the electrolyte layer side with respect to a peak pixel line at which the Sr intensity line integrated value is maximum in the second integrated value portion, and the second point corresponds to the minimum Sr intensity line integrated value on the cathode side with respect to the peak pixel line; and the intermediate layer includes a solid solution layer containing Zr, Ce and at least one of Gd and Sm, and a thickness of the solid solution layer is equal to 0.246 μm or more.

2. An electrochemical reaction single cell according to claim 1, wherein the thickness of the solid solution layer is equal to 0.482 μm or less.

3. An electrochemical reaction single cell according to claim 1, wherein the $SrZrO_3$ integrated value in at least one cross section parallel to the first direction is 1,600 to 9,200.

4. An electrochemical reaction single cell according to claim 3, wherein the solid solution layer has a thickness of 0.271 μm to 0.457 μm.

5. An electrochemical reaction single cell according to claim 1, wherein the $SrZrO_3$ integrated value in at least one cross section parallel to the first direction is 3,100 to 7,800.

6. An electrochemical reaction single cell according to claim 5, wherein the intermediate layer includes a solid solution layer containing at least one of Gd and Sm, Ce, and Zr, and the solid solution layer has a thickness of 0.307 μm to 0.422 μm.

7. An electrochemical reaction single cell according to claim 1, wherein the electrolyte layer contains a solid oxide.

8. An electrochemical reaction single cell according to claim 1, wherein the electrochemical reaction single cell is a fuel cell single cell.

9. An electrochemical reaction cell stack comprising a plurality of electrochemical reaction single cells disposed in the first direction, the electrochemical reaction cell stack being characterized in that:

at least one of the electrochemical reaction single cells is an electrochemical reaction single cell as recited in claim 1.

* * * * *